US008866783B2

(12) United States Patent
Saitoh et al.

(10) Patent No.: US 8,866,783 B2
(45) Date of Patent: Oct. 21, 2014

(54) DISPLAY DEVICE, METHOD FOR DRIVING SAME, AND ELECTRONIC APPARATUS

(75) Inventors: Kohji Saitoh, Osaka (JP); Jun Nakata, Osaka (JP); Akizumi Fujioka, Osaka (JP); Masami Ozaki, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/984,714

(22) PCT Filed: Apr. 4, 2012

(86) PCT No.: PCT/JP2012/059149
§ 371 (c)(1),
(2), (4) Date: Aug. 9, 2013

(87) PCT Pub. No.: WO2012/137800
PCT Pub. Date: Oct. 11, 2012

(65) Prior Publication Data
US 2013/0314361 A1 Nov. 28, 2013

(30) Foreign Application Priority Data

Apr. 8, 2011 (JP) ................................ 2011-086813

(51) Int. Cl.
*G06F 3/041* (2006.01)
*H05B 1/02* (2006.01)
*G09G 3/20* (2006.01)

(52) U.S. Cl.
CPC .............. *G06F 3/041* (2013.01); *G06F 3/0416* (2013.01); *G06F 3/0412* (2013.01); *G09G 2310/08* (2013.01); *G09G 3/20* (2013.01)
USPC .......................................... 345/173; 219/497

(58) Field of Classification Search
USPC .......................................................... 345/173
See application file for complete search history.

(56) References Cited

U.S. PATENT DOCUMENTS

| 4,558,315 | A | * | 12/1985 | Weiss et al. .................... 345/55 |
| 5,534,892 | A | | 7/1996 | Tagawa |
| 5,638,089 | A | | 6/1997 | Takemoto |
| 5,726,677 | A | * | 3/1998 | Imamura ......................... 345/99 |
| 5,739,804 | A | | 4/1998 | Okumura et al. |

(Continued)

FOREIGN PATENT DOCUMENTS

| JP | 4-310995 A | 11/1992 |
| JP | 5-324167 A | 12/1993 |

(Continued)

OTHER PUBLICATIONS

Official Communication issued in International Patent Application No. PCT/JP2012/059149, mailed on May 15, 2012.

*Primary Examiner* — Charles V Hicks
(74) *Attorney, Agent, or Firm* — Keating & Bennett, LLP

(57) ABSTRACT

A display device includes: a display element for displaying an image on a screen; and driving means for driving the display element so that a scan mode for carrying out scanning and a pause mode for pausing the scanning are alternately repeated. The driving means drives, by transmitting a pause and drive control signal to the display element, the display element so that scanning of a single frame is carried out by going through the scan mode twice and the pause mode twice. During the pause mode, the driving means outputs, to a touch panel, a detection command signal which commands that detection be carried out.

17 Claims, 19 Drawing Sheets

(56) References Cited

U.S. PATENT DOCUMENTS

| | | |
|---|---|---|
| 5,877,738 A | 3/1999 | Ito et al. |
| 5,900,856 A | 5/1999 | Iino et al. |
| 5,959,603 A | 9/1999 | Ito et al. |
| 6,084,563 A | 7/2000 | Ito et al. |
| 6,452,578 B1 | 9/2002 | Ito et al. |
| 6,611,246 B1 | 8/2003 | Ito et al. |
| 2002/0180673 A1 | 12/2002 | Tsuda et al. |
| 2006/0201931 A1* | 9/2006 | Lee et al. ............ 219/497 |
| 2007/0262966 A1* | 11/2007 | Nishimura et al. ....... 345/173 |
| 2009/0122024 A1* | 5/2009 | Nakamura et al. ....... 345/173 |
| 2009/0174671 A1* | 7/2009 | Tachi et al. ............ 345/173 |
| 2010/0066724 A1* | 3/2010 | Huh et al. ............ 345/213 |
| 2010/0123743 A1* | 5/2010 | Chang et al. ............ 345/690 |
| 2010/0231559 A1 | 9/2010 | Ooga |
| 2011/0012844 A1 | 1/2011 | Chang et al. |
| 2011/0164012 A1 | 7/2011 | Maeda et al. |

FOREIGN PATENT DOCUMENTS

| | | |
|---|---|---|
| JP | 7-182107 A | 7/1995 |
| JP | 7-306397 A | 11/1995 |
| JP | 2001-060079 A | 3/2001 |
| JP | 2001-312253 A | 11/2001 |
| JP | 2007-65508 A | 3/2007 |
| JP | 2010-237651 A | 10/2010 |
| TW | 200611234 A | 4/2006 |
| TW | 201102697 A | 1/2011 |
| WO | 2010/026809 A1 | 3/2010 |

* cited by examiner

US 8,866,783 B2

DISPLAY DEVICE, METHOD FOR DRIVING SAME, AND ELECTRONIC APPARATUS

TECHNICAL FIELD

The present invention relates to (i) a display device including (a) a display element for displaying an image on a screen and (b) driving means for driving the display element so that a scan mode for carrying out scanning and a pause mode for pausing the scanning are alternately repeated, (ii) a method for driving the display device, and (iii) an electronic apparatus.

BACKGROUND ART

In recent years, thin, light, and low-power-consumption display devices such as liquid crystal display devices have been widely used. It is noteworthy that such display devices have been mounted, for example, on mobile phones, smartphones, laptop PCs (personal computers), and the like. It is also expected that in the future, development and prevalence of electronic paper (which is even a thinner display device) will be rapidly advanced. Under such circumstances, it is now a common challenge to reduce power consumption of display devices.

Patent Literature 1 discloses a display device driving method that achieves low power consumption by allowing for a non-scanning period (i) which is longer than a scanning period in which a screen is scanned once and (ii) during which all scan signal lines are in a non-scanning state.

Meanwhile, a touch panel to be mounted as a display screen of such a display device has also been widely used (such as the touch panel disclosed in Patent Literature 2). The touch panel is a locator device that (i) detects a position on the display screen as specified by a user's finger, a pen, or the like (hereinafter referred to as "finger or the like") and then (ii) outputs positional information indicative of the position thus detected. Since the touch panel allows more intuitive operations than does an input device such as a keyboard and a mouse, the touch panel has been notably mounted, for example, on a mobile phone, a smartphone, a tablet PC, or the like.

CITATION LIST

Patent Literatures

Patent Literature 1
Japanese Patent Application Publication, Tokukai, No. 2001-312253 A (Publication Date: Nov. 9, 2001)
Patent Literature 2
Japanese Patent Application Publication, Tokukai, No. 2001-060079 A (Publication Date: Mar. 6, 2001)

SUMMARY OF INVENTION

Technical Problem

Due to the influence of a drive signal in the display device, a decreased SN ratio (signal-to-noise ratio) causes the operation of detection by the touch panel to deteriorate in detection accuracy. However, the influence of a drive signal in the display device is significantly less during a non-scanning period in which the display screen is not scanned than during a scanning period in which the display screen is scanned. Hence, it is reasonable to carry out the operation of detection by the touch panel to carry out while the display device is in a non-scanning period.

FIG. 12 is a timing chart showing a temporal change in operation status of a conventional display device. In the conventional display device, a one-frame period (1/60≈16.6 ms) is largely a scanning period, and a non-scanning period is significantly short, i.e., on the order of 100 μs (see FIG. 12).

On the other hand, FIG. 13 is a timing chart showing temporal changes in operation status and signal status of the display device of Patent Literature 1. In the display device of Patent Literature 1, a scanning period in each one-frame period is shorter, so that a non-scanning period is accordingly longer. This allows the non-scanning period to be longer than a period of detection required for the operation of detection by the touch panel. Therefore, it can be expected that the detection is carried out during the non-scanning period.

Meanwhile, it is known that in order to achieve a so-called "handwriting input" function of automatically detecting symbols such as a character inputted on the touch panel by a user's handwriting, the touch panel needs to carry out the operation of detecting of handwriting approximately 100 times per second. In other words, the touch panel needs to carry out the operation of detection at a frequency of detection operation of approximately 100 Hz or more.

However, a typical display device displays images on a screen at 60 frames per second, i.e., at a refresh frequency of 60 Hz. This limits the number of non-scanning periods to only 60 and, as a result, makes it difficult to carry out the operation of detection of handwriting during the non-scanning period.

The present invention has been made in view of the foregoing problems, and it is an object of the present invention to provide, for example, a display device that is capable of (i) increasing the number of times an external detection device carries out an operation of detection and (ii) improving accuracy of a result of the detection.

Solution to Problem

In order to attain the object, a display device of the present invention includes: a display element for displaying an image on a screen; and driving means for driving the display element so that a scan mode for carrying out scanning and a pause mode for pausing the scanning are alternately repeated, the driving means being capable of driving the display element so that scanning of a single frame is carried out by going through the scan mode a plurality of times and the pause mode a plurality of times, during the pause mode, the driving means outputting, to an external detection device, a detection command signal which commands that detection be carried out.

In order to attain the object, a method of the present invention is a method for driving a display device, said display device including: a display element for displaying an image on a screen, the display device driving the display element so that a scan mode for carrying out scanning and a pause mode for pausing the scanning are alternately repeated, said method including the steps of: driving the display element so that scanning of a single frame is carried out by going through the scan mode a plurality of times and the pause mode a plurality of times, and during the pause mode, outputting, to an external detection device, a detection command signal which commands that detection be carried out.

With the configuration and the method, it is possible to scan a single frame by going through a scan mode a plurality of times and a pause mode a plurality of times. This enables the display device of the present invention to go through a pause mode more times than does a conventional display device that is configured to scan a single frame by going through a screen once and a pause mode once.

Further, the external detection device carries out detection by receiving a detection command signal which was outputted from the display device during the pause mode. This makes it possible to improve accuracy of a result of the detection. Further, since it is thus possible to increase the number of times of the pause modes, it is also possible to increase the number of times the detection is carried out. This enables the detection device to achieve, for example, handwriting input.

Advantageous Effects of Invention

As described above, it is possible with the display device of the present invention to scan a single frame once by repeating, a plurality of times, a scan mode and a pause mode. This enables the display device to have more pause modes than a conventional display device. Meanwhile, since the display device is configured to output, during a pause mode, a detection command signal to an external detection device, it is possible to (i) increase the number of times the external detection device carries out detection and (ii) improve accuracy of a result of the detection.

DESCRIPTION OF EMBODIMENTS

Embodiment 1

An embodiment of the present invention is described with reference to FIGS. 1 through 3, FIG. 9, and FIG. 19.

(Configuration of an Electronic Apparatus 1)

Figure 9:
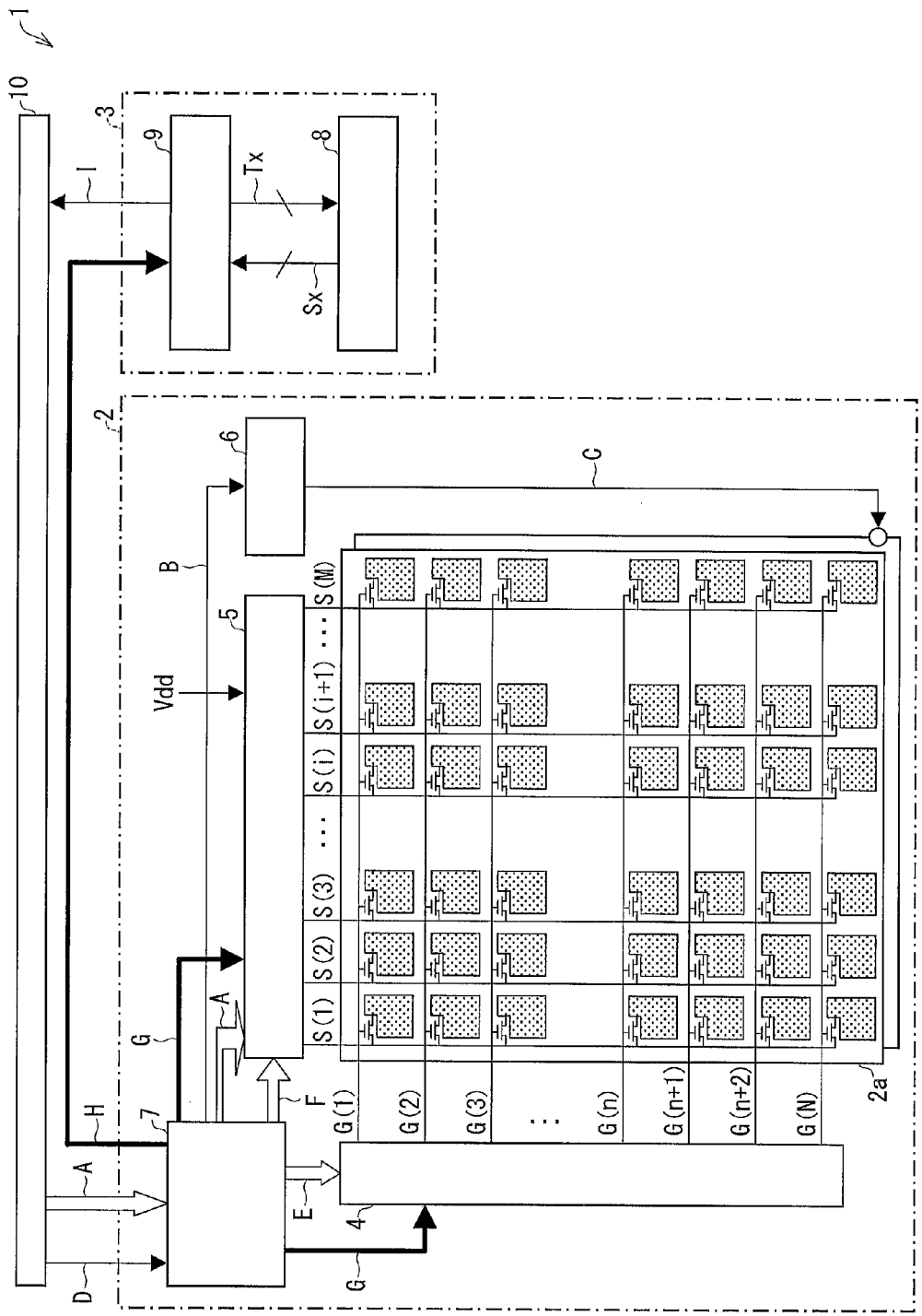
FIG. 9 is a block diagram showing in detail a configuration of the electronic apparatus.

First, a configuration of an electronic apparatus 1 according to the present embodiment is described with reference to FIG. 9. FIG. 9 is a block diagram showing the configuration of the electronic apparatus 1 in detail. As shown in FIG. 9, the electronic apparatus 1 includes a display device 2, a touch panel 3, and a main device 10. In the electronic apparatus 1 of the present embodiment, the main device 10 outputs a video image to the display device 2 so that the display device 2 displays the video image, and the main device 10 obtains user's instructions via the touch panel 3 and carries out various processes in accordance with the user's instructions thus obtained. Note that the main device 10 may also output any information such as a still image or a symbol as well as a video image to the display device 2 so that the display device 2 displays the information.

The display device 2 includes a display panel (display element) 2a, a scanning line drive circuit (gate driver, driving means) 4, a signal line drive circuit (source driver, driving means) 5, a common electrode drive circuit 6, and a timing controller (driving means) 7. The touch panel 3 includes a detecting section 8 and a controlling section 9.

The display panel 2a includes a screen constituted by pixels that are arranged in a matrix. The display panel 2a further includes N (which is a given integer) scan signal lines G (gate lines) that are selected line-sequentially so that the screen is scanned. The display panel 2a further includes M (which is a given integer) data signal lines S (source lines) via each of which a data signal is supplied to a single row of pixels on a selected line. The scan signal lines G and the data signal lines S intersect with each other.

In FIG. 9 G(n) denotes the nth (where n is an integer of 1 or more and N or less) scan signal line G. For example, G(1), G(2), and G(3) denote the first, second, and third scan signal lines G, respectively. On the other hand, S(i) denotes the ith (where i is an integer of 1 or more and M or less) data signal line S. For example, S(1), S(2), and S(3) denote the first, second, and third data signal lines S, respectively.

The scanning line drive circuit 4, for example, scans the scan signal lines G in sequence from the top to the bottom of the screen. In so doing, the scanning line drive circuit 4 supplies, to each of the scan signal lines G, a rectangular wave that turns on a switching element connected to a pixel electrode provided in each of the pixels. This causes a single row of pixels in the screen to be in a selected state.

However, the way in which the scanning line drive circuit 4 carries out scanning is not limited to the aforementioned sequential scanning. For example, the scanning line drive circuit 4 may also carry out interlaced scanning of the scan signal lines G in such a manner that odd-numbered scan signal lines G(1), G(3), G(5), and so on are scanned first and then the even-numbered scan signal lines G(2), G(4), G(6), and so on are scanned.

The signal line drive circuit 5 receives a video signal (indicated by an arrow A) from the main device 10 via the timing controller 7, calculates, from the video signal, a value of a voltage that is to be supplied a single row of pixels on a selected line, and then supplies, to the data signal lines S, a voltage having the value thus calculated. This causes the pixels on the selected scan signal lines G to be supplied with image data.

The display device 2 includes a common electrode (not illustrated) provided for all the pixels in the screen. The common electrode drive circuit 6 receives a signal (indicated by an arrow B) from the timing controller 7 and, in accordance with the signal, outputs, to the common electrode, a predetermined common voltage (indicated by an arrow C) for driving the common electrode.

The timing controller 7 receives, from the main device 10, a clock signal (clock signal), a horizontal sync signal (video sync signal), and a vertical sync signal (video sync signal), all of which are indicated by an arrow D. In accordance with these signals, the timing controller 7 outputs, to the circuits, signals in accordance with which the circuits operate in synchronization. Specifically, the timing controller 7 (i) outputs a gate start pulse signal, a gate clock signal, and a gate output enable signal (all of which are indicated by an arrow E) to the scanning line drive circuit 4 in accordance with the vertical sync signal, and (ii) outputs a source start pulse signal, a source latch strobe signal, and a source clock signal (indicated by an arrow F) to the signal line drive circuit 5 in accordance with the horizontal sync signal.

Upon receiving the gate start pulse signal from the timing controller 7, the scanning line drive circuit 4 starts scanning of the display panel 2a. Then, the scanning line drive circuit 4 selectively applies a voltage to the scan signal lines G in sequence in accordance with the gate clock signal, which is a signal that causes a shift in selection state of the scan signal lines G. Upon receiving the source start pulse signal from the timing controller 7, the signal line drive circuit 5 stores image data on each of the pixels in a register in accordance with the source clock signal. After having stored the image data, the signal line drive circuit 5 writes the image data onto the data signal lines S on the display panel 2a in accordance with the source latch strobe signal. For the writing of the image data, the signal line drive circuit 5 uses its analogue amplifier, for example.

In the touch panel 3, the detecting section 8 is provided on the screen of the display panel 2a so as to detect a position on the screen as specified by a user's finger or the like, and the controlling section 9 controls the detecting section 8. Specifically, when the controlling section 9 drives the detecting section 8 via a driving line Tx, the detecting section 8 detects the position and then (b) transmit a detection signal to the controlling section 9 via a detection line Sx. The controlling section 9 creates, in accordance with the detection signal from the detecting section 8, detection data (indicated by an arrow I) indicative of the position thus detected, and then transmits the detection data to the main device 10.

In the present embodiment, the touch panel 3 used is of a projected capacitance type, in which case the detecting section 8 includes (i) a transparent substrate made of glass, plastic, or the like and (ii) a matrix of transparent electrode patterns made of ITO (indium tin oxide) or the like. When a user's finger or the like touches or approaches an area on the detecting section 8, there occurs a change in capacitance of a plurality transparent electrode patterns in the vicinity of the area. This allows the controlling section 9 to, by detecting a change in electric current through or voltage across the transparent electrode patterns, detect the position of the area which the user's finger touched or approached.

Alternatively, the touch panel 3 may detect a user's finger touching or approaching a given position on the screen. In such a case, the touch panel 3 needs only detect the touch or approach, and does not need to detect the position.

The main device 10 carries out various processes examples of which include recognizing a user's operation in accordance with detection data from the touch panel 3, transmitting a video signal and a video sync signal to the display device 2 in order to control a display of the display device 2, and the like.

Note that voltages necessary for the circuits in the electronic apparatus 1 to operate are supplied, for example from a power source generating circuit (not illustrated). The power source generating circuit may be included in the main device 10. In this case, voltages are supplied from the main device 10 to the display device 2, voltages are supplied from the main device 10 to the touch panel 3. An example of the voltages necessary for the circuits in the electronic apparatus 1 to operate is a voltage Vdd that is supplied to the signal line drive circuit 5.

Note also that the terms "drive circuits 4 and 5" is used hereinafter to collectively refer to the scanning line drive circuit 4 and the signal line drive circuit 5.

In the present embodiment, the timing controller 7 outputs, to each of the drive circuits 4 and 5, a pause and drive control signal (indicated by an arrow G) which is a signal for driving and pausing each of the drive circuits 4 and 5.

Specifically, in a case where the display device 2 is in a scan mode for carrying out scanning, the timing controller 7 outputs, to each of the drive circuits 4 and 5, a pause and drive control signal that commands the drive circuits 4 and 5 to be driven. This causes the drive circuits 4 and 5 to drive the display panel 2a so as to scan a display.

On the other hand, in a case where the display device 2 is in a pause mode for pausing the scanning, the timing controller 7 outputs, to each of the drive circuits 4 and 5, a pause and drive control signal that commands the drive circuits 4 and 5 to pause. This causes the drive circuit 4, 5 to stop scanning the display. The timing controller 7 alternately repeats the scan mode and the pause mode.

In the case where the display device 2 is in the pause mode, the timing controller 7 also outputs, to the controlling section 9 of the touch panel 3, a detection command signal (indicated by an arrow H) that commands the touch panel 3 to carry out an operation of detection. In the touch panel 3, as soon as the controlling section 9 receives the detection command signal from the timing controller 7, the detecting section 8 carries out an operation of detection, and the controlling section 9 outputs, to the main device 10, detection data indicative of a result of the detection.

Furthermore, in the present embodiment, the timing controller 7 outputs the pause and drive control signal to each of the drive circuits 4 and 5 so that scanning of a single frame is carried out by going through the scan mode twice and the pause mode twice.

Figure 1:
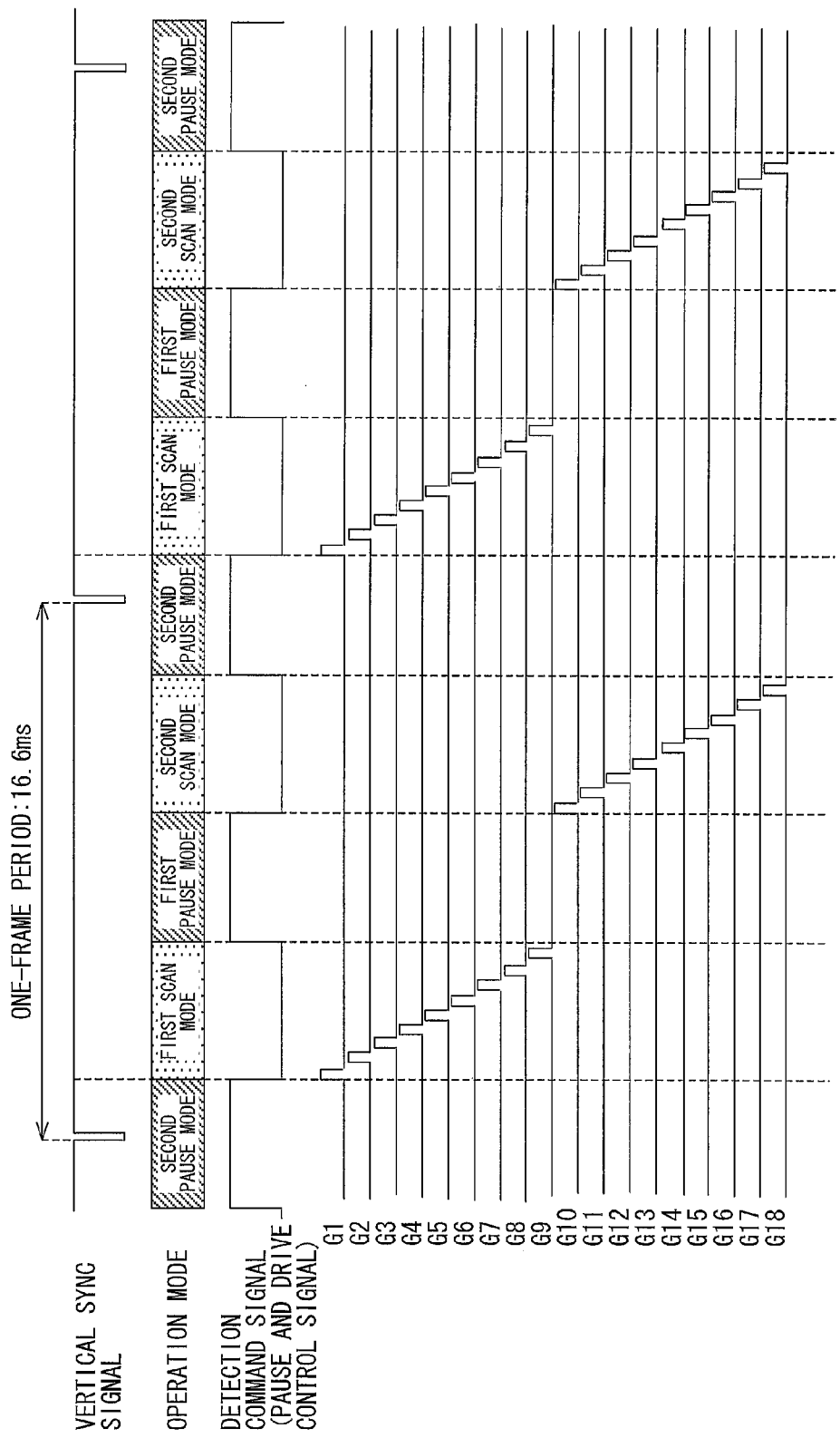
FIG. 1 is a timing chart showing temporal changes in operation status and signal status of a display device of an electronic apparatus according to an embodiment of the present invention.

FIG. 1 is a timing chart showing temporal changes in operation status and signal status of the display device 2 of the present embodiment. Specifically, FIG. 1 shows (i) a vertical sync signal, (ii) an operation mode, (iii) a pause and drive control signal, and (iv) signals to be outputted to the scan signal lines G, respectively, starting from the top.

Note that in the present embodiment and the embodiments that follow, the pause and drive control signal and the detection command signal are identical to each other. However, this does imply any limitation. For example, the pause and drive control signal and the detection command signal may be opposite in phase to each other. In addition, a change in the detection command signal may start after the pause and drive control signal causes the display device 2 to be in a pause mode. In other words, it is possible to set a timing of the start of an operation of detection to follow a timing at which the display device 2 comes into the pause mode. Furthermore, although FIG. 1 shows eighteen scan signal lines G for simplification, this does not imply any limitation on the number of scan signal lines G.

According to FIG. 1, first, upon reception of a falling pulse of the vertical sync signal, scanning of a single frame starts, followed by transition of the display device 2 to a first scan mode. During the first scan mode, the pause and drive control signal is dropped to a low (L) level. This causes the scan signal lines G1 to G9 to be driven in sequence so that an upper half of the screen is scanned. Note that since the detection command signal is dropped to a low (L) level, the operation of detection by the touch panel 3 is paused.

Next, the display device 2 shifts to a first pause mode. During the first pause mode, the pause and drive control signal is raised to a high (H) level so that the scanning is paused, and the detection command signal is raised to a high (H) level so that the touch panel 3 carries out the operation of detection.

Next, the display device 2 shifts to a second scan mode. During the second scan mode, the pause and drive control signal is dropped to a low (L) level. This causes the scan signal lines G10 to G18 to be driven in sequence so that a lower half of the screen is scanned. This is how scanning of a single frame is completed. Note that since the detection command signal is dropped to a low (L) level, the operation of detection by the touch panel 3 is paused.

Next, the display device 2 shifts to a second pause mode. During the second pause mode, the pause and drive control signal is raised to a high (H) level so that the scanning is paused, and the detection command signal is raised to a high (H) level so that the touch panel 3 carries out the operation of detection. After that, another falling pulse of the vertical sync signal is inputted, and the aforementioned operation is repeated.

Figure 13:
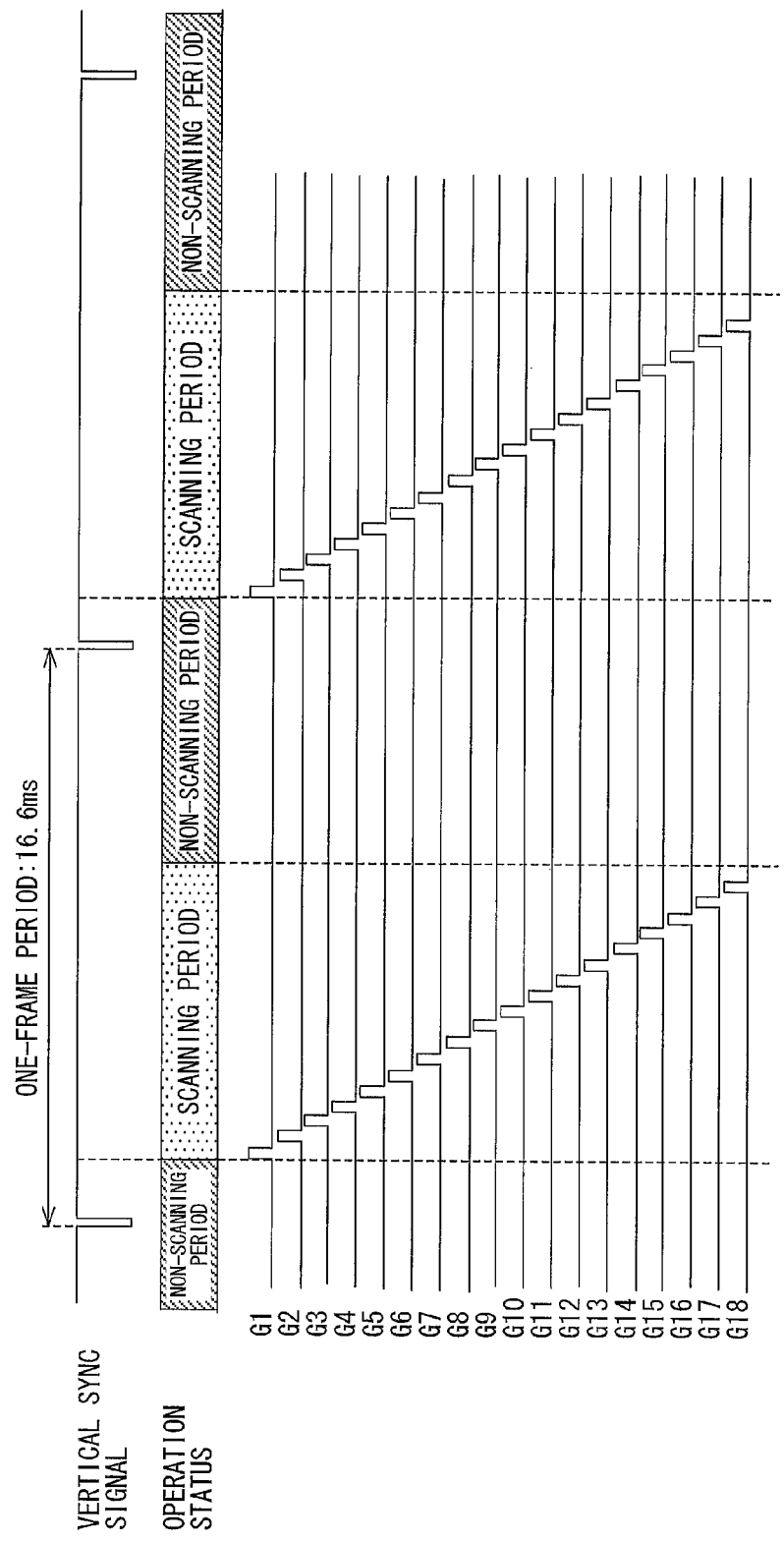
FIG. 13 is a timing chart showing temporal changes in operation status and signal status of another conventional display device.

A comparison between FIG. 1 and FIG. 13, which shows a conventional example, shows that there is an increase in the number of pause modes (pause periods) per frame period from 1 in the conventional example to 2 in the present embodiment. Since 60 one-frame periods normally make up 1 second, the number of pause modes per second in the present embodiment is 120 (=2×60).

Further, the touch panel 3 carries out an operation of detection during a pause mode in which the influence of drive signals is limited. This makes it possible to improve accuracy of a result of the detection. Further, the detection can be carried out 120 times per second. This allows the detection to be compatible with handwriting input.

Further, in the present embodiment, each of the pixels of the display panel 2a has, as its switching element, a TFT (thin-film transistor) whose semiconductor layer is made of a so-called oxide semiconductor. The oxide semiconductor contains, for example, IGZO (InGaZnOx). Advantages of this configuration are described with reference to FIG. 19.

Figure 19:
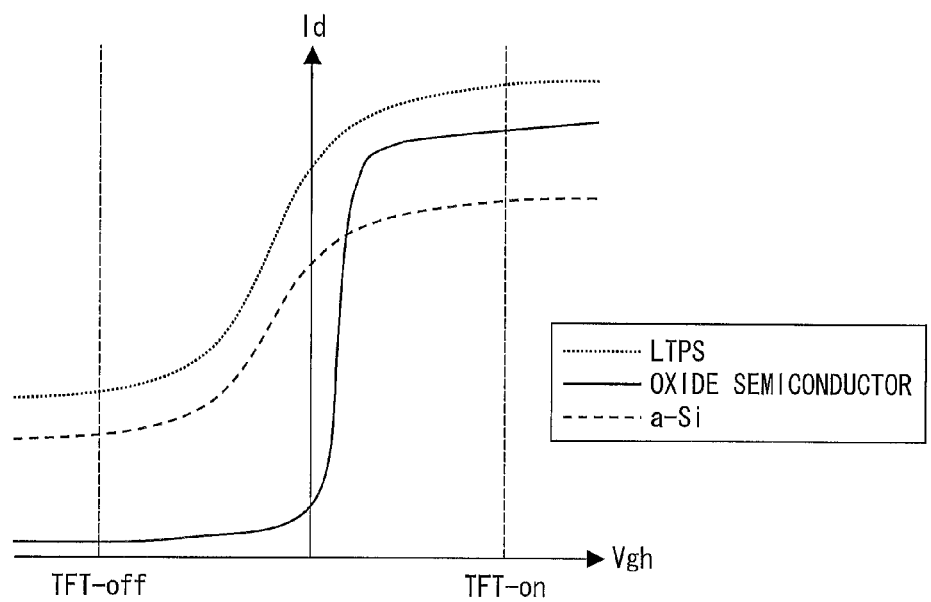
FIG. 19 is a graph showing characteristics of various TFTs.

FIG. 19 is a graph showing characteristics of various TFTs. Specifically, FIG. 19 shows the respective characteristics of (i) a TFT whose semiconductor layer is made of an oxide semiconductor (hereinafter referred to as "oxide semiconductor TFT"), (ii) a TFT whose semiconductor layer is made of a-Si (amorphous silicon) (hereinafter referred to as "a-Si TFT"), and (iii) a TFT whose semiconductor layer is made of LTPS (Low Temperature Poly Silicon) (hereinafter referred to as "LTPS TFT"). In FIG. 19, the horizontal axis represents a gate voltage Vgh, and the vertical axis represents a drain current Id.

As shown in FIG. 19, in a case where the gate voltage Vgh is at a voltage threshold Vgh (TFT-off) or lower, each of the TFTs is in an off state in which the drain current Id is small and substantially constant. In a case where the gate voltage Vgh is raised and exceeds the voltage threshold Vgh (TFT-off), the drain current Id is raised. In a case where the gate voltage Vgh is further raised and exceeds another threshold Vgh (TFT-on), each of the TFTs is in an on state in which the drain current Id is large and substantially constant.

Further, in the on state, as shown in FIG. 19, the oxide semiconductor TFT is greater in electric current (i.e., in electron mobility) than the a-Si TFT. Specifically, although not illustrated, the drain current Id at the threshold Vgh (TFT-on) is 1 µA in the case of the a-Si TFT, whereas the drain current Id at the threshold Vgh (TFT-on) is approximately 20 µA to 50 µA in the case of the oxide semiconductor TFT. This indicates that the electron mobility of the oxide semiconductor TFT in the on state is approximately 20 to 50 times as high as that of the a-Si TFT in the on state and, therefore, that the oxide semiconductor TFT is greatly superior in "on" characteristic to the a-Si semiconductor TFT.

Furthermore, in the off state, as shown in FIG. 19, the oxide semiconductor TFT is smaller in electric current (i.e., in leakage current) than the a-Si TFT and the LTPS TFT. Specifically, although not illustrated, the drain current Id at the threshold Vgh (TFT-off) is 10 pA in the case of the a-Si TFT, whereas the drain current Id at the threshold Vgh (TFT-off) is 0.1 pA in the case of the oxide semiconductor TFT. This indicates that an amount of leakage current of the oxide semiconductor TFT in the off state is approximately 1/100 of that of the a-Si TFT in the off state and, therefore, that the oxide semiconductor TFT hardly produces a leakage current and is greatly superior in "off" characteristic.

For the reasons stated above, by employing, as a switching element of each of the pixels in the display device 2 of the present embodiment, a TFT whose semiconductor layer is made of an oxide semiconductor, each of the pixels can be given greatly superior "on" and "off" characteristics. This increases the amount of electron transfer during writing of image data onto each of the pixels, thus making it possible to better shorten the amount of time for the writing.

In other words, since the display device 2 of the present embodiment makes it possible to carry out remarkably high-speed scanning and shorten a period of scan modes, it can sufficiently secure a period of pause modes. This makes it possible to further improve accuracy of a result of detection by the touch panel 3.

Figure 2:
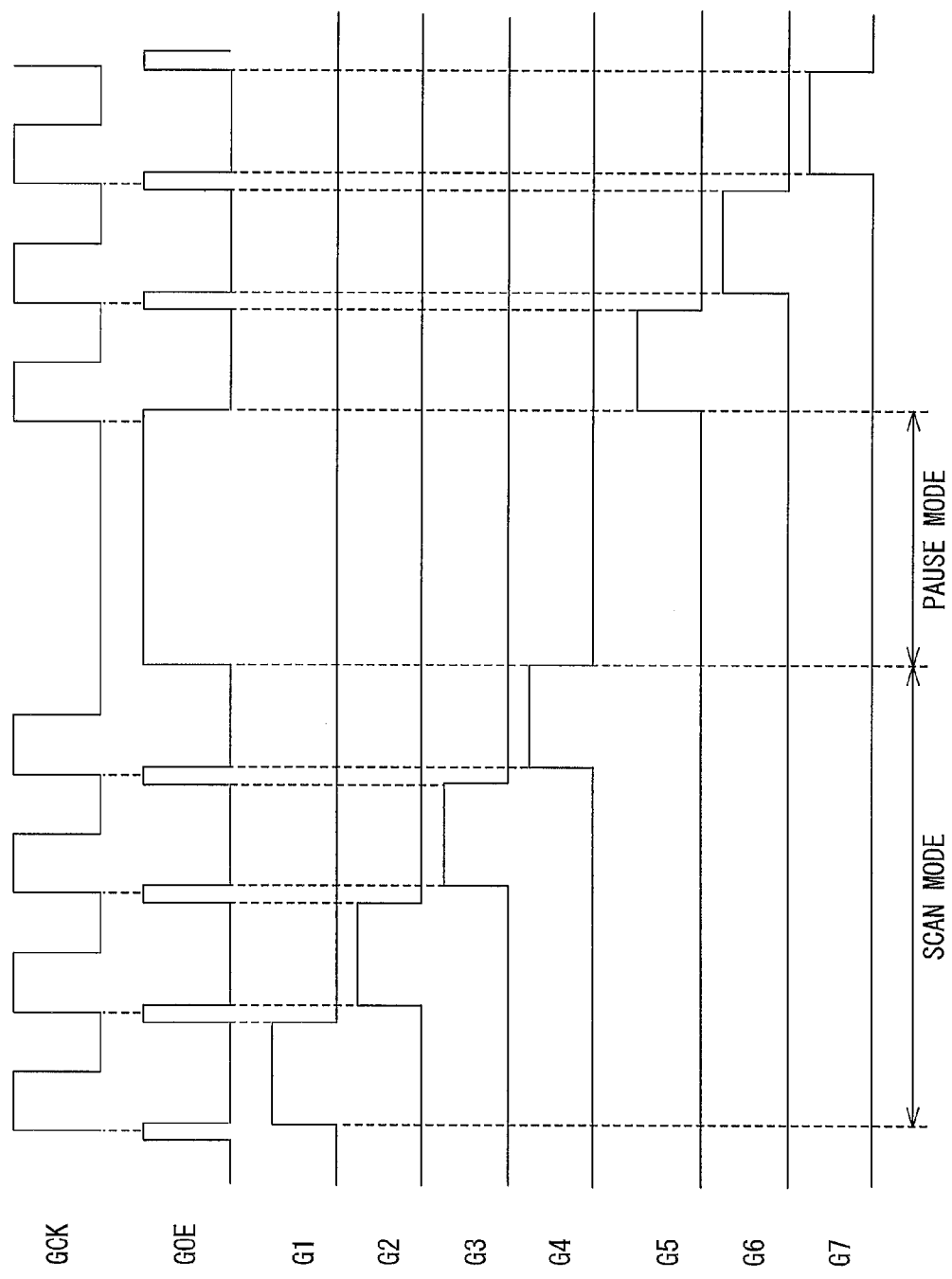
FIG. 2 is a timing chart showing examples of control signals to a scanning line drive circuit and of signals from the scanning line drive circuit during a pause mode of the display device.

In the present embodiment, the timing controller 7 generates new pause and drive control signals and outputs them to the drive circuits 4 and 5. However, the timing controller 7 may also pause and drive the display device 2 by using existing signals alone instead of generating a new pause and drive control signal for the signal line drive circuit 5. FIG. 2 is a timing chart showing examples of control signals to the scanning line drive circuit 4 and of signals from the scanning line drive circuit 4. Specifically, FIG. 2 shows temporal changes in a gate clock signal GCK, a gate output enable signal GOE, and scan signals G1 to G7, starting from the top.

The gate output enable signal GOE (i) rises at a point in time where a first predetermined amount of time has elapsed since a falling edge of the gate clock signal GCK (i.e., a point in time immediately before a rising edge of the gate clock signal GCK) and (ii) falls at a point in time where a second predetermined amount of time has elapsed since the rising edge of the gate clock signal GCK. When the gate output enable signal GOE rises, a scan signal G currently at a high level falls. When the gate output enable signal GOE falls, the next scan signal G, which comes directly after the one that fell, rises. In other words, when the gate output enable signal GOE is at a high level, all of the scan signals G are at a low level, with the result that the driving pauses.

Then, once the display device 2 comes into a pause mode, the gate clock signal GCK is maintained at a low level, and the gate output enabling signal GOE is maintained at a high level after the first predetermined amount of time has elapsed. As a result, the driving of the scan signal lines G pauses. It can thus be understood that pausing and driving of the display device 2 can be achieved by using the existing signals alone.

Figure 3:
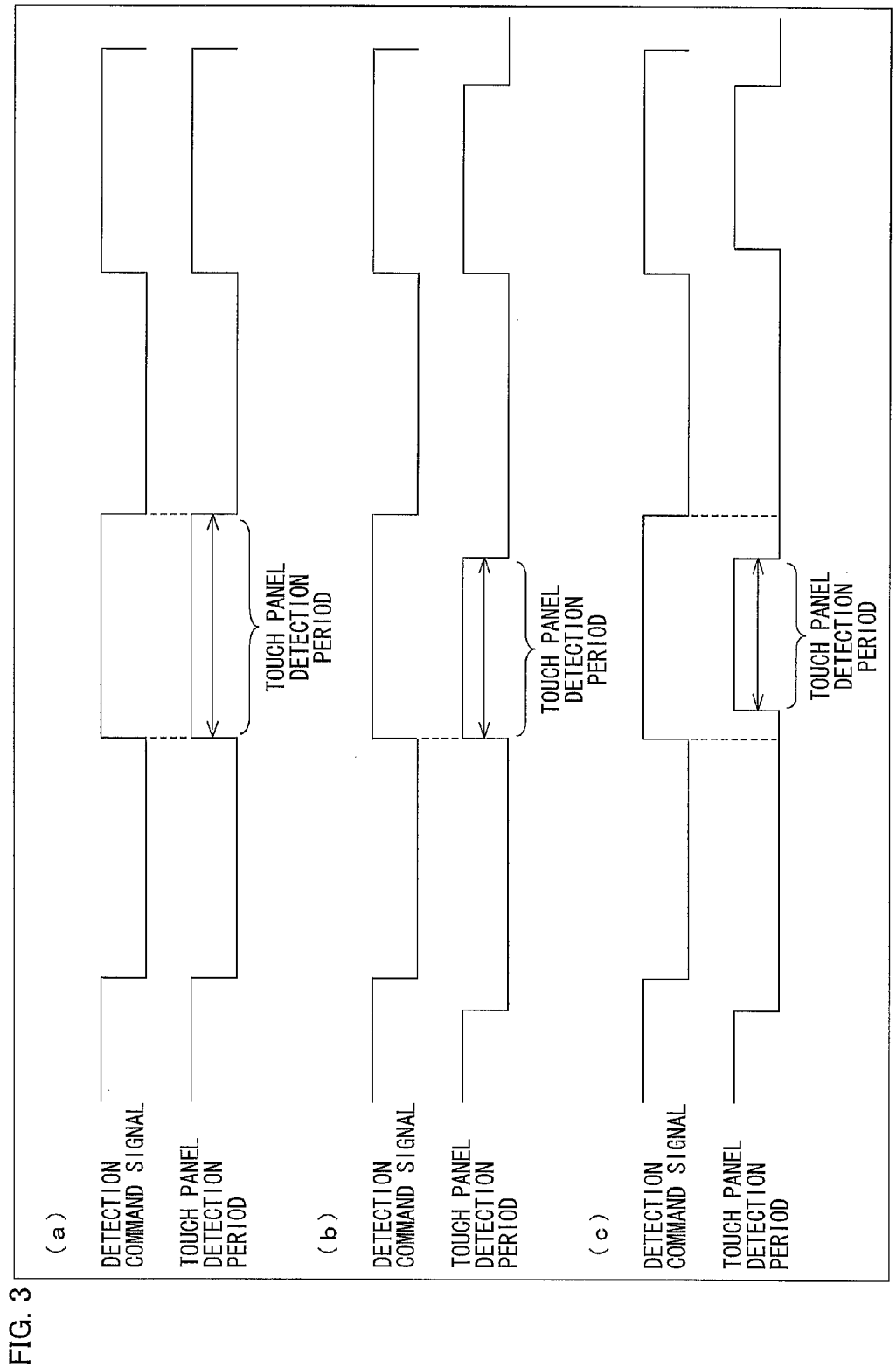
FIG. 3 is a set of timing charts (a) through (c) each showing an example of a relationship between a detection command signal from the display device and a period of detection by a touch panel of the electronic apparatus.

Note that the touch panel 3 can carry out an operation of detection at any timing within a period which is longer than a minimum amount of time required for the operation and which falls within a period during which a detection command signal is at a high level. FIG. 3 is a set of timing charts (a) through (c) each showing an example of a relationship between a detection command signal and a period of detection by the touch panel 3. Specifically, (a) through (c) of FIG. 3 each shows a detection command signal in an upper part thereof and a period of detection by the touch panel 3 (during which the detection command signal is at a high level) in a lower part thereof.

In the example shown in (a) of FIG. 3, the period of detection by the touch panel 3 is a period during which the detection command signal is at a high level. In the example shown in (b) of FIG. 3, the period of detection by the touch panel 3 is a predetermined period of time that has elapsed since a rising edge of the detection command signal. Note that the predetermined period of time needs only be equal to or longer than a period during which the detection command signal is at a high level. In the example shown in (c) of FIG. 3, the period of detection by the touch panel 3 is a period that starts at a point in time after a rising edge of the detection command signal and ends at a point in time before a falling edge of the detection command signal. Therefore, it can be understood from (a) through (c) of FIG. 3 that the period of detection by the touch panel 3 can be altered in various ways.

Further, although, in the present embodiment, the touch panel 3 used is of a projected capacitance type, it is possible to alternatively use a touch panel 3 of any detection type such as a surface capacitance type or a resistive type. Note that in the case of a touch panel 3 of a projected capacitance type, where the detecting section 8 has a plurality of electrode patterns formed therein, the detecting section 8 is susceptible to the influence of driving in the display panel 2a. Therefore, a more remarkable effect can be expected to be brought about by applying a display device 2 of the present invention on an electronic apparatus 1 including a touch panel 3 of a projected capacitance system.

Embodiment 2

Another embodiment of the present invention is discussed with reference to FIG. 4. An electronic apparatus 1 of the present embodiment is identical to the electronic apparatus 1 shown in FIG. 1, except that when in a pause mode, the signal line drive circuit 5 has its driving performance lowered. Note that members which are similar in configuration and processing to the members described in Embodiment 1 are given the same reference signs, and as such, are not described below.

Figure 4:
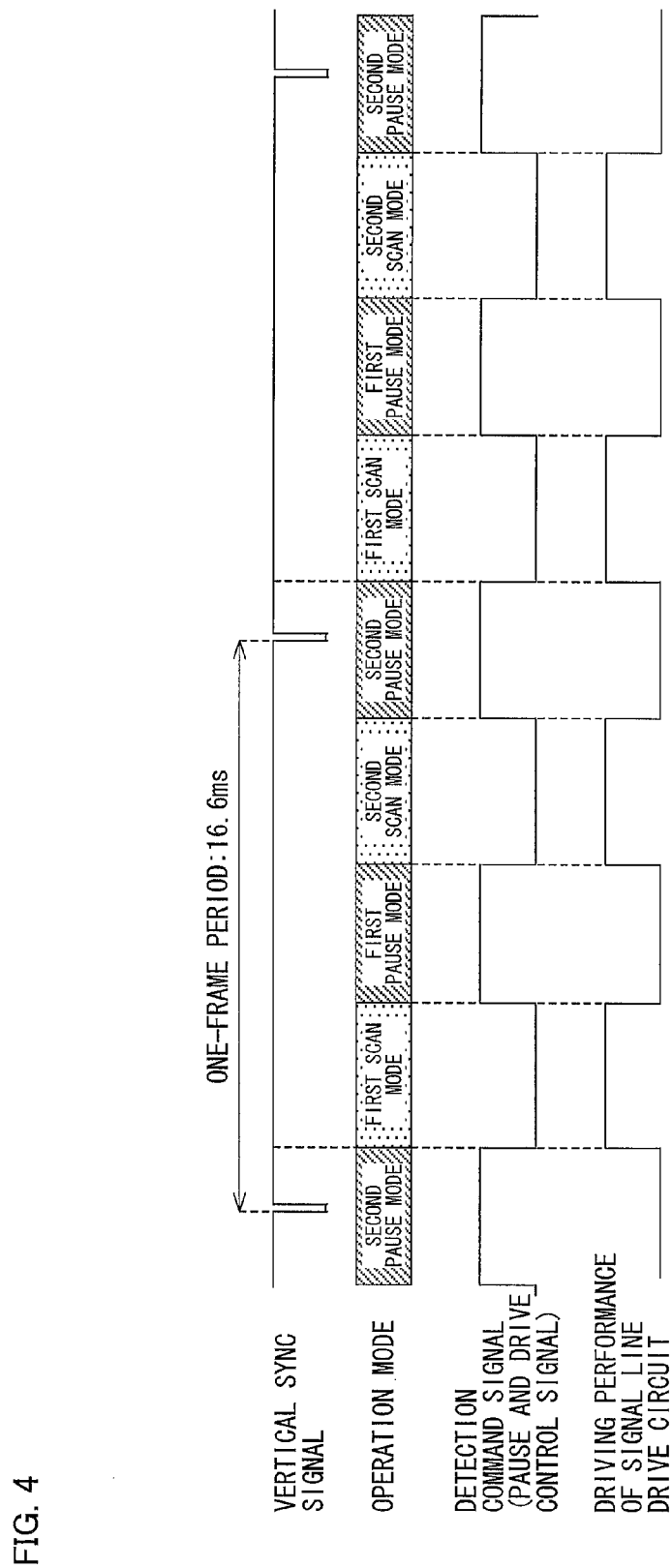
FIG. 4 is a timing chart showing temporal changes in operation status and signal status of a display device of an electronic apparatus according to another embodiment of the present invention.

FIG. 4 is a timing chart showing temporal changes in operation status and signal status of the display device 2 of the present embodiment. Specifically, FIG. 4 shows a vertical sync signal, an operation status, and a state of driving performance of the signal line drive circuit 5, starting from the top. Note that when the driving performance is at a high level, the signal line drive circuit 5 is in a state in which to carry out normal driving and that when the driving performance is at a low level, the signal line drive circuit 5 is in a state in to have its driving performance lowered. The driving performance of the signal line drive circuit 5 can be lowered by various methods, examples of which encompass (a) stopping a receiving circuit from receiving a horizontal sync signal and a video image signal, (b) stopping an analogue amplifier, and (c) reducing the operation speed by half.

FIG. 4 shows that the signal line drive circuit 5 carries out normal driving during first and second scan modes and has is driving performance lowered during first and second pause modes. This allows the display device 2 reduce power consumption during the pause modes. Further, since the display device 2 can reduce the generation of noises by the driving, accuracy of a result of detection by a touch panel 3 can be further improved.

Embodiment 3

Next, still another embodiment of the present invention is described with reference to FIG. 5. An electronic apparatus 1 of the present embodiment is identical to the electronic apparatus 1 shown in FIG. 1, except that (i) the display device 2 employs interlaced scanning as a way of scanning and (ii) the polarity of a data signal is inverted immediately before the display device 2 shifts from a first pause mode to a second scan mode. Note that members which are similar in configuration and processing to the members described in Embodiments 1 and 2 are given the same reference signs, and as such, are not described below.

Figure 5:
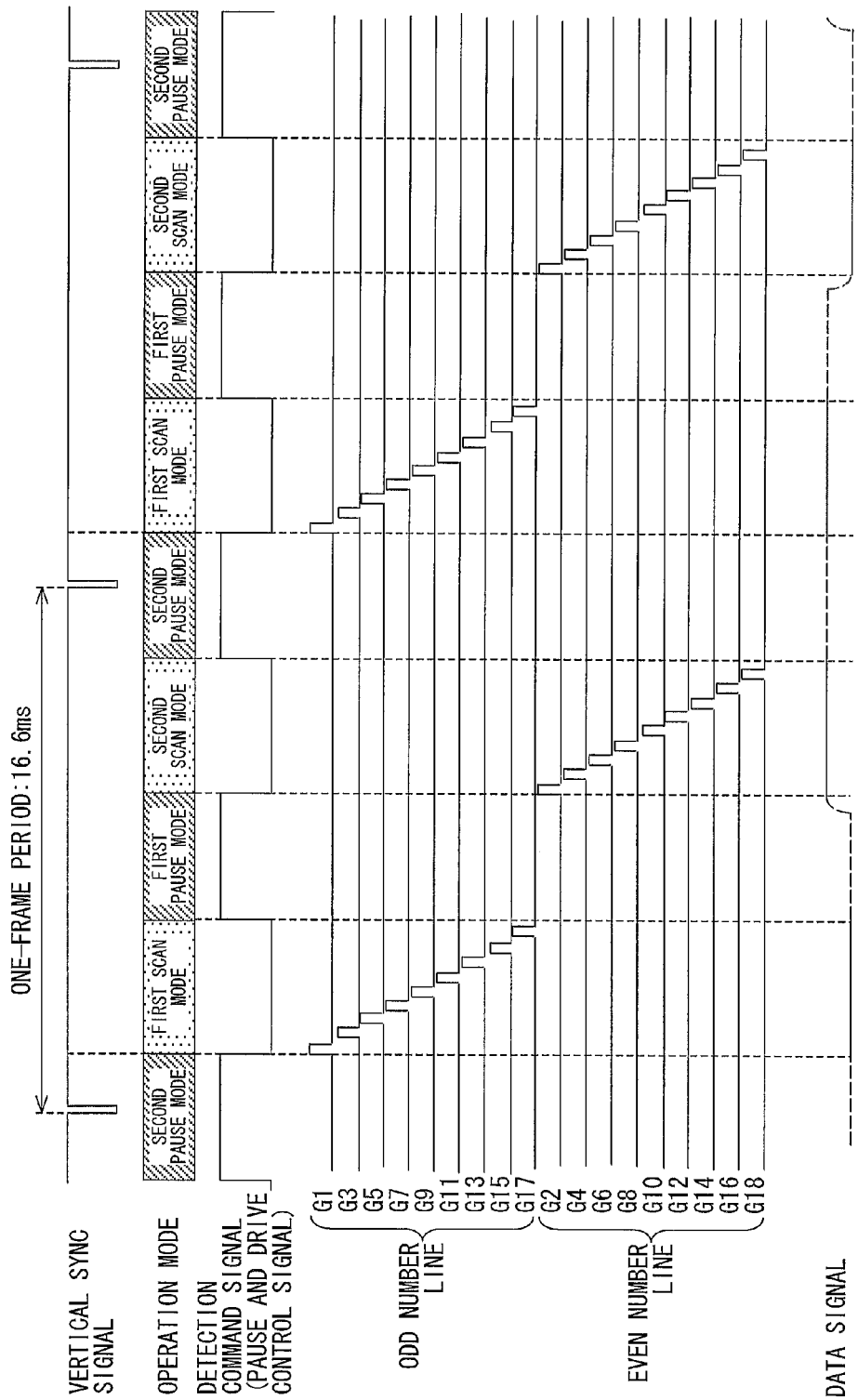
FIG. 5 is a timing chart showing temporal changes in operation status and signal status of a display device of an electronic apparatus according to another embodiment of the present invention.

FIG. 5 is a timing chart showing temporal changes in operation status and signal status of the display device 2 of the present embodiment. Specifically, FIG. 5 shows (i) a vertical sync signal, (ii) an operation status, (iii) a pause and drive control signal, (iv) scan signal to be outputted to the scan signal lines G, respectively, and (v) the polarity of a data signal to be outputted to the data signal lines S, starting from the top.

According to FIG. 5, first, upon reception of a falling pulse of the vertical sync signal, scanning of a single frame starts, followed by transition of the display device 2 to a first scan mode. During the first scan mode, the pause and drive control signal is dropped to a low level. This causes the odd-numbered scan signal lines G1, G3, G5, and so on to be driven in sequence so that a half of the screen is scanned. Note that since the detection command signal accordingly is dropped to a low (L) level, the operation of detection by the touch panel 3 is paused.

Next, the display device 2 shifts to a first pause mode. During the first pause mode, the pause and drive control signal is raised to a high (H) level so that the scanning is paused and the detection command signal is raised to a high (H) level so that the touch panel 3 carries out the operation of detection.

Next, the polarity of the data signal is inverted immediately before the display device 2 shifts to a second scan mode, and then the display device 2 shifts to the second scan mode. During the second scan mode, the pause and drive control signal is raised to a high (H) level. This causes the even-numbered scan signal lines G2, G4, G6, and so on to be driven in sequence so that the remaining half of the screen is scanned. This is how scanning of a single frame is completed. Note that since the detection signal is dropped to a low (L) level, the operation of detection by the touch panel 3 is paused.

Next, the display device 2 shifts to a second pause mode. During the second pause mode, the pause and drive control signal is raised to a high (H) level so that the scanning is paused, and the detection command signal is raised to a high (H) level so that the touch panel 3 carries out the operation of detection. After that, another falling pulse of the vertical sync signal is inputted, and the aforementioned operation is repeated.

In the case of the display device 2 shown in FIG. 1, there exists a period of a pause mode between a period in which the upper part of the screen is scanned and a period in which the lower part of the screen is scanned. This causes scanning of a single frame to be discontinuously carried out, and may therefore result in display quality deterioration, such as the appearance of a visible line on a boundary between the upper part and the lower part. On the other hand, the display device 2 of the present embodiment carries out interlaced scanning. This eliminates the risk of appearance of such a visible line, thus making it possible to inhibiting display quality deterioration.

Further, since the polarity of the data signal is inverted during a next one-frame period, it is possible to prevent an image from burning in the display panel 2a. It should be noted that in a case where the polarity of the data signal is inverted immediately after the transition from the first scan mode to the first pause mode, there is a risk of display quality deterioration, such as the appearance of a visible luminance gradient. In the display device 2 of the present embodiment, on the other hand, the polarity of the data signal is inverted immediately before the transition to the second scan mode, as opposed to being inverted immediately before the transition from the first scan mode to the first pause mode. This causes a period of time up to inversion of the polarity to be longer. This reduces the possibility of appearance of the visible luminance gradient becomes low, and therefore makes it possible to inhibit display quality deterioration.

The following description will discuss driving of the display device 2 to invert the polarity of the data signal. It is preferable that each pixel electrode in the display panel 2a inverts the polarity of voltage a predetermined number of times (e.g., once) per one-frame period. This prevents burn-in of an image on the screen from being caused by displaying the same image on the same part of the screen for an extended period of time. The terms "frame inversion" refers to a method of inversion that repeats the process of (i) applying, in a given frame, voltages each having a first polarity to all the pixel electrodes of the display device 2 and (ii) applying, during a next frame immediately following the given frame, voltages each having a second polarity to all the pixel electrodes of the display device 2, the second polarity being opposite the first polarity. The frame inversion can be achieved by inverting, for every one-frame period, the polarity of a voltage that is applied to all the data signal lines S during a given frame.

It is also preferable, in order to prevent flickering, that the polarity of voltage be inverted for each line of pixel electrodes arranged in at least either (i) a direction in which the scan signal lines G extend or (ii) a direction in which the data signal lines S extend. Examples of such a method of inversion encompass "source inversion", "line inversion", and "dot inversion." Each of these methods of inversion are described in detail with reference to FIGS. 14 through 17.

FIGS. 14 through 17 are each a structural drawing a structure of scan signal lines G, data signal lines S, and pixels electrodes in the display panel 2a. (a) of each of FIGS. 14 through 17 shows the polarities of voltages across the pixel electrodes in a given frame (nth frame). (b) of each of FIGS. 14 through 17 shows the polarities of voltages across the pixel electrodes in a next frame ((n+1)th frame), the voltages being opposite in polarity to the voltages shown in (a) of each of FIGS. 14 through 17. In FIGS. 14 through 17, the polarity of a voltage across each of the pixel electrodes is indicated by "+" (positive) or "−" (negative).

Figure 14:
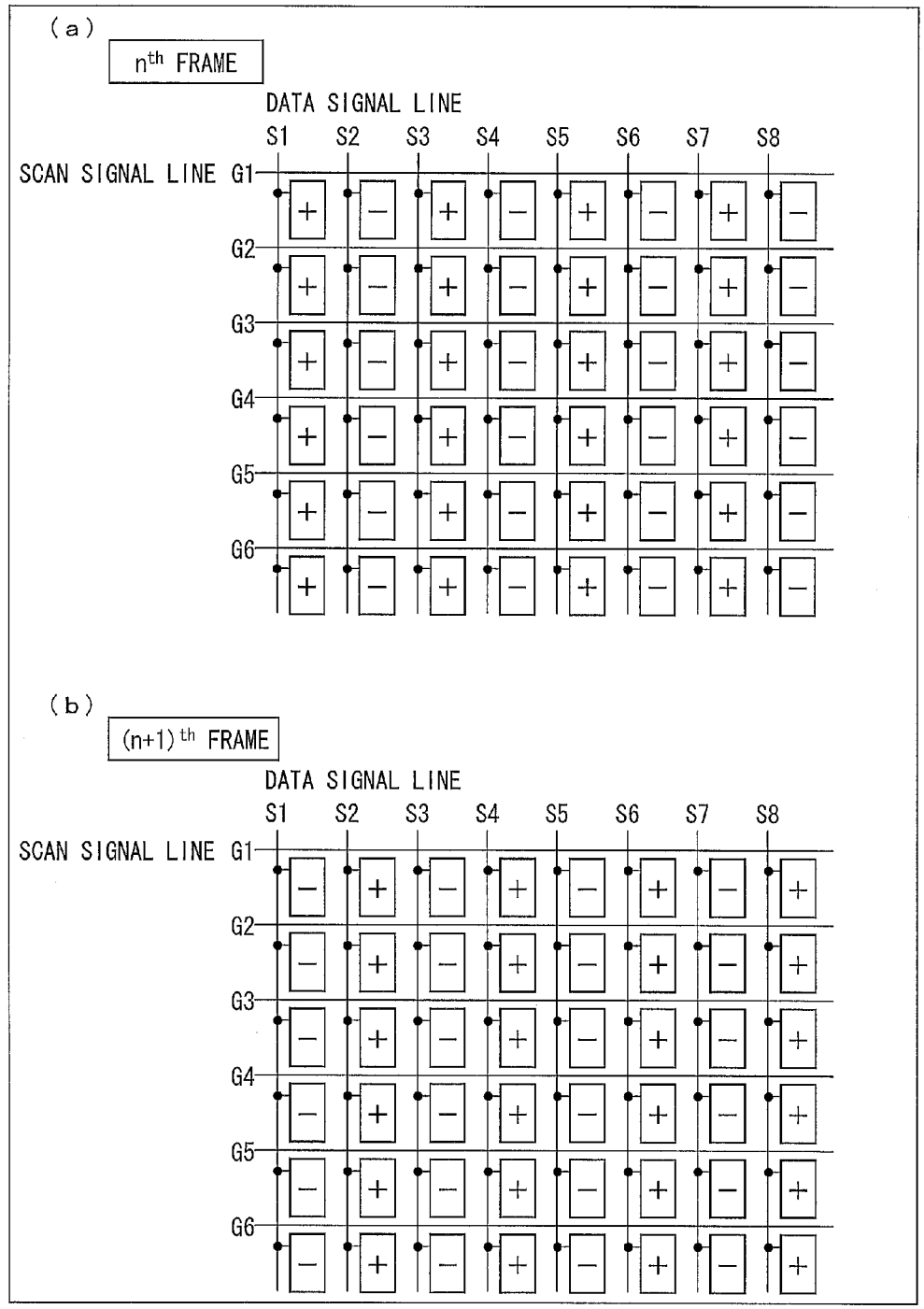
FIG. 14 is a structural drawing showing an example of a structure of a display panel of the display device and (ii) an example of source inversion and frame inversion.

FIG. 14 shows an example of source inversion. Source inversion is inversion of the polarity of a voltage that is applied for each data signal line (source line) S. This makes it possible to, as shown in FIG. 14, invert the polarity of a voltage for each of the pixel electrodes arranged in the direction in which the scan signal lines G extend.

Figure 15:
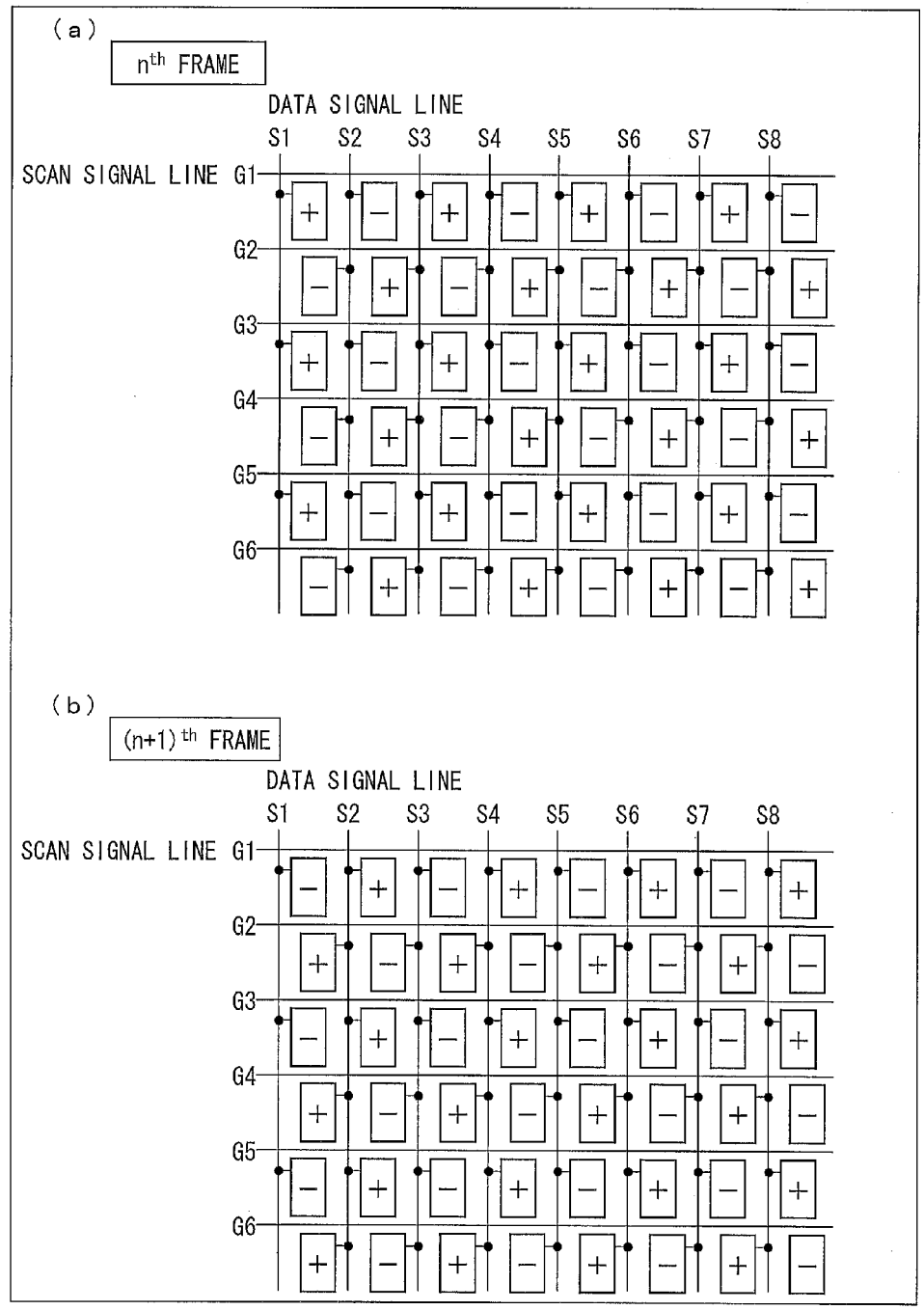
FIG. 15 is a structural drawing showing another example of the structure of the display panel and another example of source inversion and frame inversion.

FIG. 15 shows source inversion as FIG. 14 does. However, FIG. 15 differs from FIG. 14 in terms of the arrangement of pixel electrodes. In FIG. 14, the pixel electrodes connected to the data signal lines S are disposed on one side (in the example shown FIG. 14, on the right side) of the data signal lines S. In FIG. 15, on the other hand, the pixel electrodes connected to the data signal lines S are disposed in a staggered manner. Therefore, the polarities of voltages across the pixel electrodes arranged in line between adjacent data signal lines S are all the same in the case of FIG. 14, or are the same for every other one of the pixel electrodes in the case of FIG. 15.

Figure 16:
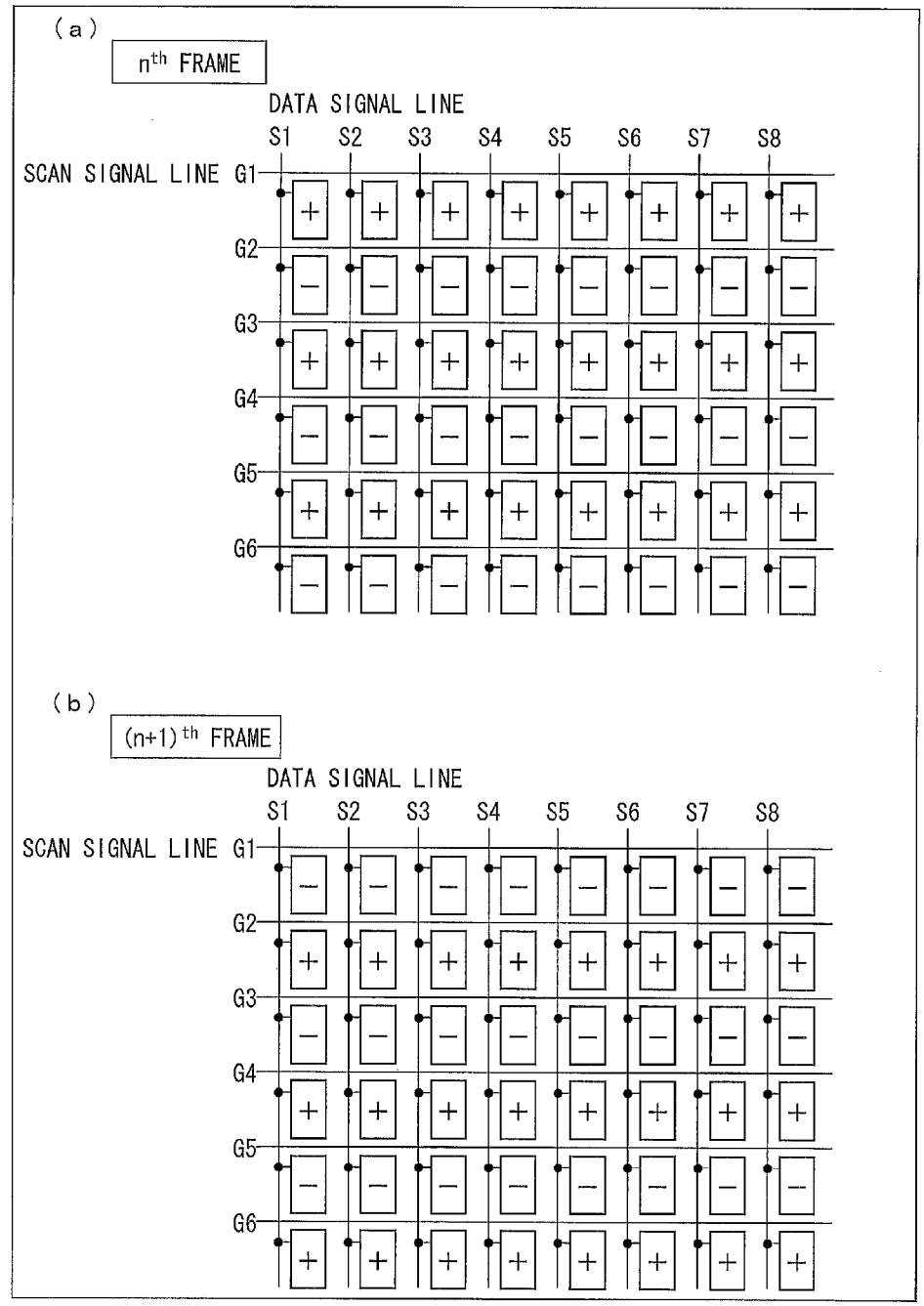
FIG. 16 is a structural drawing showing an example of a structure of the display panel and an example of line inversion and frame inversion.

FIG. 16 shows an example of line inversion. Line inversion is inversion of the polarities of voltages that are applied to each data signal line S for every scan signal line G that is driven (i.e., for each horizontal scanning period). This makes it possible to, as shown in FIG. 14, invert the polarity of a voltage for each of the pixel electrodes arranged in the direction in which the data signal lines S extend.

Figure 17:
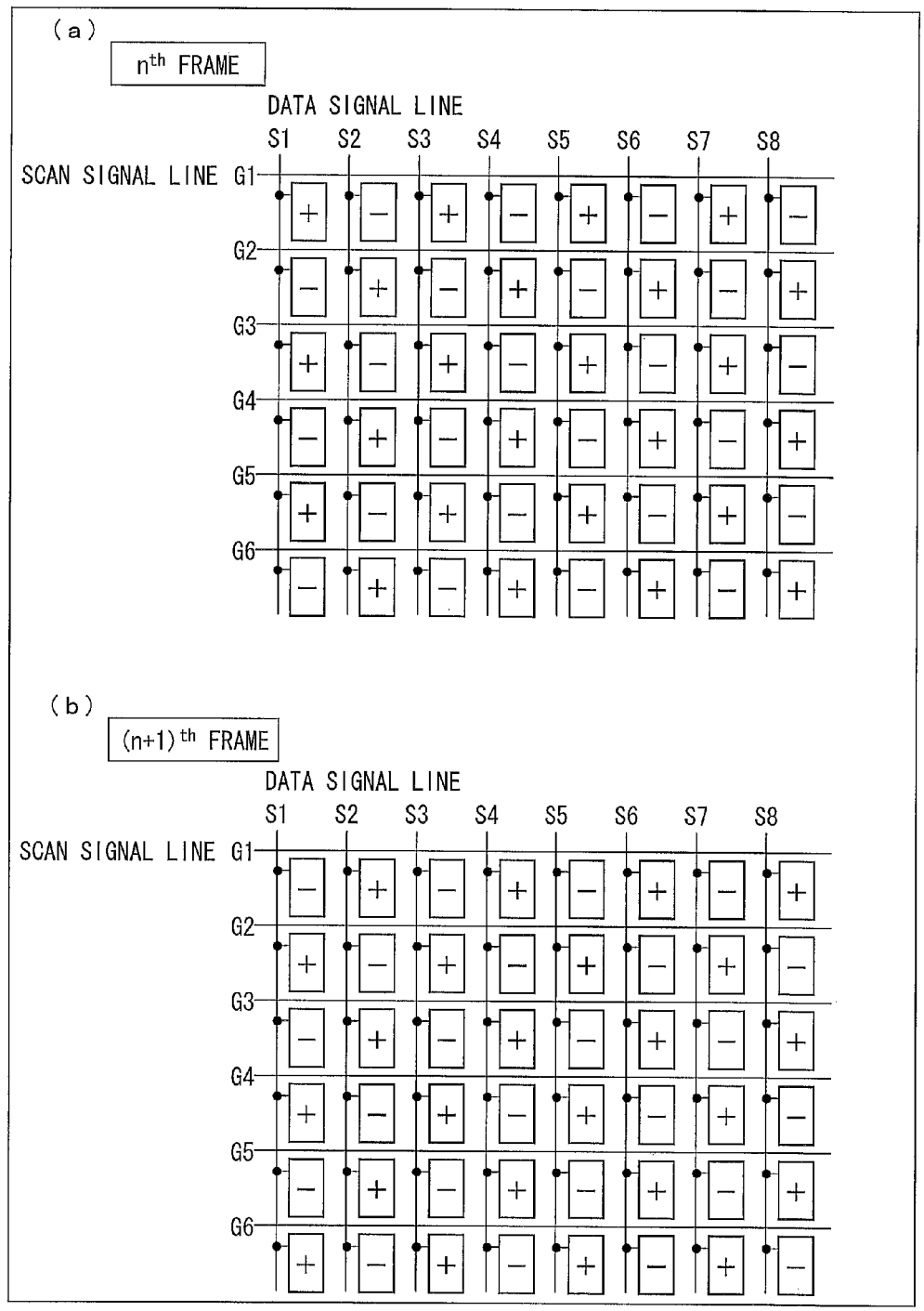
FIG. 17 is a structural drawing showing an example of a structure of the display panel and an example of dot inversion and frame inversion.

FIG. 17 shows an example of dot inversion. Dot inversion can be achieved by combining together the source inversion shown in FIG. 14 and the line inversion shown in FIG. 16. Specifically, the polarities of voltages across pixel electrodes adjacent to each other in the direction in which the scan signal lines G extend can be made opposite and the polarities of voltages across pixel electrodes adjacent to each other in the direction in which the data signal lines S extend can be made opposite, as shown in FIG. 17, by (i) applying a voltage of a positive polarity to the first data signal line S and inverting the polarity for every subsequent data signal line S in sequence while the first scan signal line G1 is being driven, (ii) applying a voltage of a negative polarity to the first data signal line S and inverting the polarity for every subsequent data signal line S in sequence while the second scan signal line G2 is being driven, and (iii) repeating a similar step while the third scan signal line G3 or any one of the subsequent scan signal lines G is being driven.

In the case of the display device 2 of the present embodiment, a voltages that is applied to a data signal line S during the first scan mode and a voltage that is applied to the data signal line S during the second scan mode are made opposite in polarity to each other, while interlaced scanning is carried out (see FIG. 5). This makes it possible to achieve such line inversion as that shown in FIG. 16. This makes it possible to achieve line inversion while achieving lower power consumption in comparison with the case where the polarity of a voltage is inverted for each scan signal line G that is driven. Note also that, while the number of scan signal lines G to be skipped at a time during the interlaced scanning of the present embodiment 3 is 1, it is also possible to employ interlaced scanning that skips more than one scan signal line G at a time.

Embodiment 4

Next, still another embodiment of the present invention is described with reference to FIG. 6. An electronic apparatus 1 of the present embodiment is identical to the electronic apparatus 1 shown in FIG. 1, except that (i) scanning of a single frame is carried out by going through a scan mode three times and a pause mode three times and (ii) the polarity of the data signal is inverted immediately before transition from a pause mode to a scan mode. Note that members which are similar in configuration and processing to the members described in Embodiment 1 are given the same reference signs, and as such, are not described below.

Figure 6:
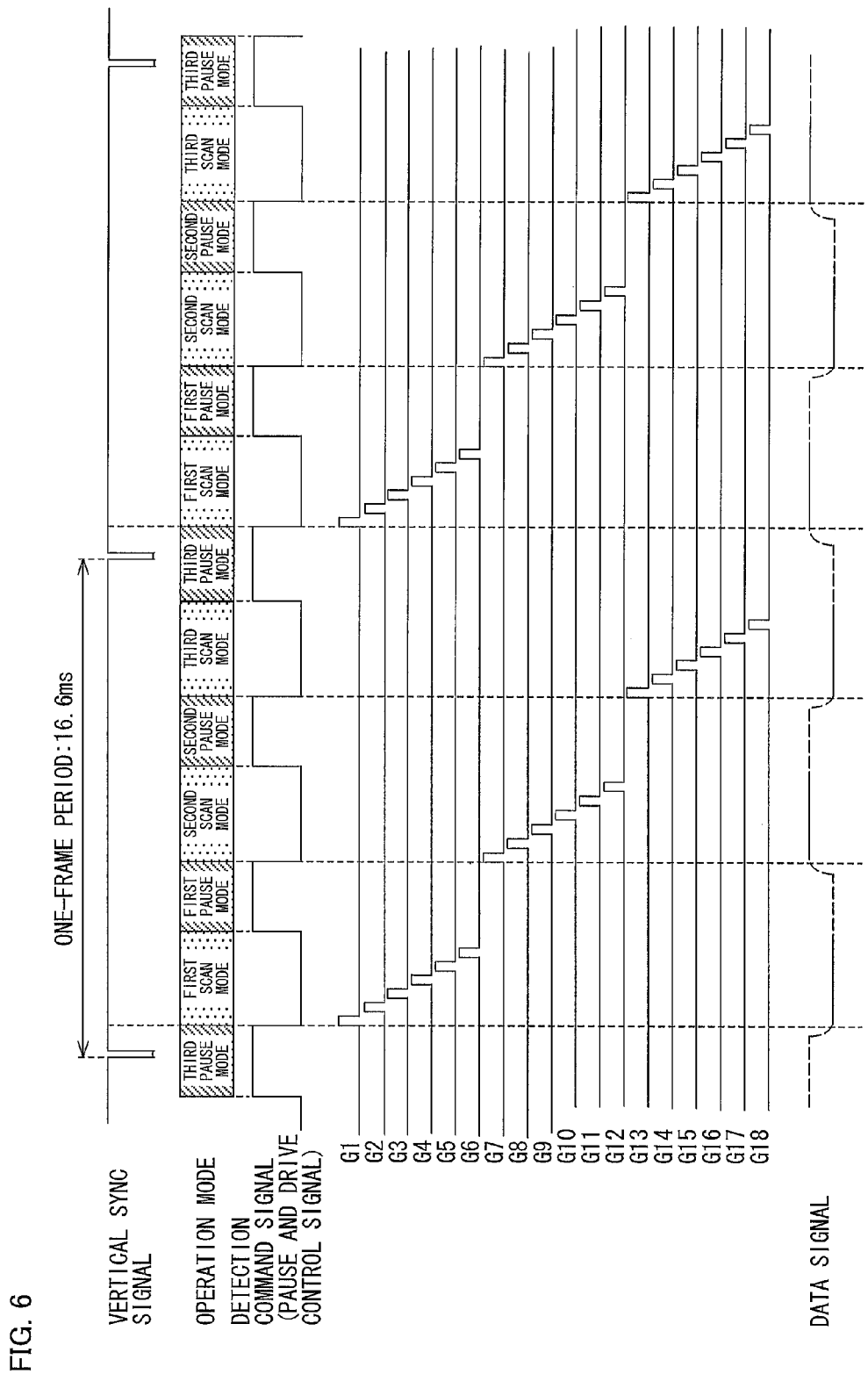
FIG. 6 is a timing chart showing temporal changes in operation status and signal status of a display device of an electronic apparatus according to another embodiment of the present invention.

FIG. 6 is a timing chart showing temporal changes in operation status and signal status of the display device 2 of the present embodiment. Specifically, FIG. 6 shows (i) a vertical sync signal, (ii) an operation status, (iii) a pause and drive control signal, (iii) scan signals to be outputted to the scan signal lines G, respectively, and (v) the polarity of a data signal to be outputted to the data signal lines S.

According to FIG. 6, first, upon reception of a falling pulse of the vertical sync signal, scanning of a single frame starts. Next, the polarity of the data signal is inverted immediately before the display device 2 shifts to a first scan mode, and then the display device 2 shifts to the first scan mode. During the first scan mode, the pause and drive control signal is dropped to a low (L) level. This causes the upper scan signal lines G1 through G6 to be driven so that an upper part of the screen is scanned. Note that since the detection command signal is dropped to a low (L) level, the operation of detection the touch panel 3 is paused.

Next, the display device 2 shifts to a first pause mode. During the first pause mode, the pause and drive control signal is raised to a high (H) level so that the scanning is paused, and the detection command signal is raised to a high (H) level so that the touch panel 3 carries out the operation of detection.

Next, the polarity of the data signal is inverted immediately before the display device 2 shifts to a second scan mode, and then the display device 2 shifts to the second scan mode. During the second scan mode, the pause and drive control signal is dropped to a low (L) level. This causes the middle scan signal lines G7 through G12 to be driven in sequence so that a middle part of the screen is scanned. Note that since the detection command signal is dropped to a low (L) level, the operation of detection by the touch panel 3 is paused.

Next, the display device 2 shifts to a third pause mode. During the third pause mode, the pause and drive control signal is raised to a high (H) level so that the scanning is paused, and the detection command signal is raised to a high (H) so that the touch panel 3 carries out the operation of detection.

Next, the polarity of the data signal is inverted immediately before the display device 2 shifts to a third scan mode, and then the display device 2 shifts to the third scan mode. During the third scan mode, the pause and drive control signal is dropped to a low (L) level. This causes the lower scan signal lines G13 through G18 to be driven in sequence so that a lower part of the screen is scanned. This is how scanning of a single frame is completed. Note that since the detection command signal is dropped to a low (L) level, the operation of detection by the touch panel 3 is paused.

Next, the display device 2 shifts to a third pause mode. During the third pause mode, the pause and drive control signal is raised to a high (H) level so that the scanning is paused, and the detection command signal is raised to a high (H) level so that the touch panel 3 carries out the operation of detection. After that, another pulse of the vertical sync signal is inputted, and the aforementioned operation is repeated.

With the display device 2 of Embodiment 4, it is thus possible to bring about the advantageous effects of the present invention even in a case where the number of scan modes and the number of pause modes in a one-frame period are three or more each.

Further, since the polarity of the data signal is inverted during a next one-frame period, it is possible to prevent an image from burning in the display panel 2a. Further, the polarity of the data signal is inverted immediately before the transition to a next scan mode, as opposed to being inverted immediately before the transition from a scan mode to a pause mode. This causes a period of time up to inversion of the polarity to be longer. This reduces the possibility of appearance of the visible luminance gradient becomes low, and therefore makes it possible to inhibit display quality deterioration.

Embodiment 5

Another embodiment of the present invention is described with reference to FIGS. 7 and 8. An electronic apparatus 1 of the present embodiment is identical to the electronic apparatus 1 shown in FIG. 1, except that the timing controller 7 of the present embodiment is capable of outputting between (i) a timing signal for normal-mode scanning by which scanning of a single frame is carried out by going through a scan mode once and a pause mode once and (ii) a timing signal for multi-mode scanning by which scanning of a single frame is carried out by going through a scan mode twice and a pause modes twice. Note that members which are similar in configuration and processing to the members described in Embodiment 1 are given the same reference signs, and as such, are not described below.

Figure 7:
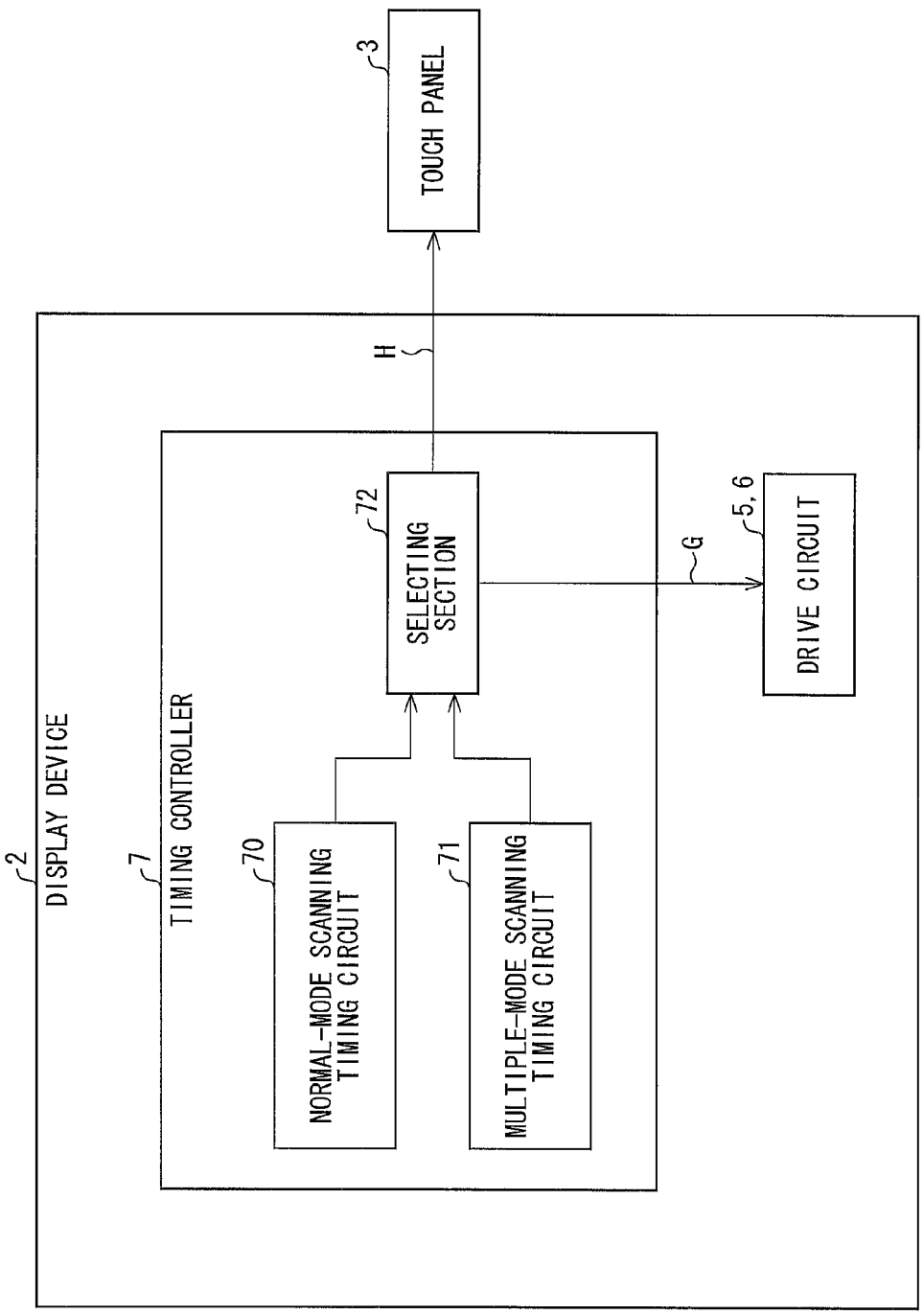
FIG. 7 is a block diagram schematically showing a configuration of a timing controller in a display device of an electronic apparatus according to another embodiment of the present invention.

FIG. 7 is a block diagram schematically showing a configuration of the timing controller 7 of the display device 2 according to the preset embodiment. As shown in FIG. 7, the timing controller 7 includes a normal-mode scanning timing circuit (normal-mode scanning driving means) 70, a multi-mode scanning timing circuit (multi-mode scanning driving means) 71, and a selecting section (selecting means) 72.

The normal-mode scanning timing circuit 70 generates a pause and drive control signal and a detection command signal so that scanning of a single frame is carried out by going through a scan mode once and a pause mode once (such scanning being hereinafter referred to as "normal-mode scanning"). The multi-mode scanning timing circuit 71 generates a pause and drive control signal and a detection command signal so that scanning of a single frame is carried out by going through a scan mode twice and a pause mode twice (such scanning being hereinafter referred to as "multi-mode scanning").

The selecting section 72 selects, in accordance with a predetermined condition, either the normal-mode scanning timing circuit 70 or the multi-mode scanning timing circuit 71 from which to receive a pause and drive control signal and a detection command signal. After receiving the pause and drive control signal and the detection command signal from the circuit thus selected, the selecting section 72 outputs them to the signal line drive circuit 5, the common electrode drive circuit 6, and the touch panel 3.

Various possible examples of the predetermined condition encompass a condition under which normal-mode scanning and multi-mode scanning are alternately carried out for every one-frame period. In such a case, the number of times the touch panel 3 carries out an operation of detection per second is 90 according to the equation 60 times×1.5=90 times.

The various possible examples also encompass a condition under which (i) multi-mode scanning is carried out in a predetermined number of one-frame periods out of 1 second and (ii) normal-mode scanning is carried out in the remaining number of one-frame periods. For example, in a case where multi-mode scanning is carried out in first 40 one-frame periods and normal-mode scanning is carried out in the remaining 20 one-frame periods, the number of times the touch panel 3 carries out an operation detection per second is 100 according to the equation 40 times×2+20 times=100 times.

Figure 8:
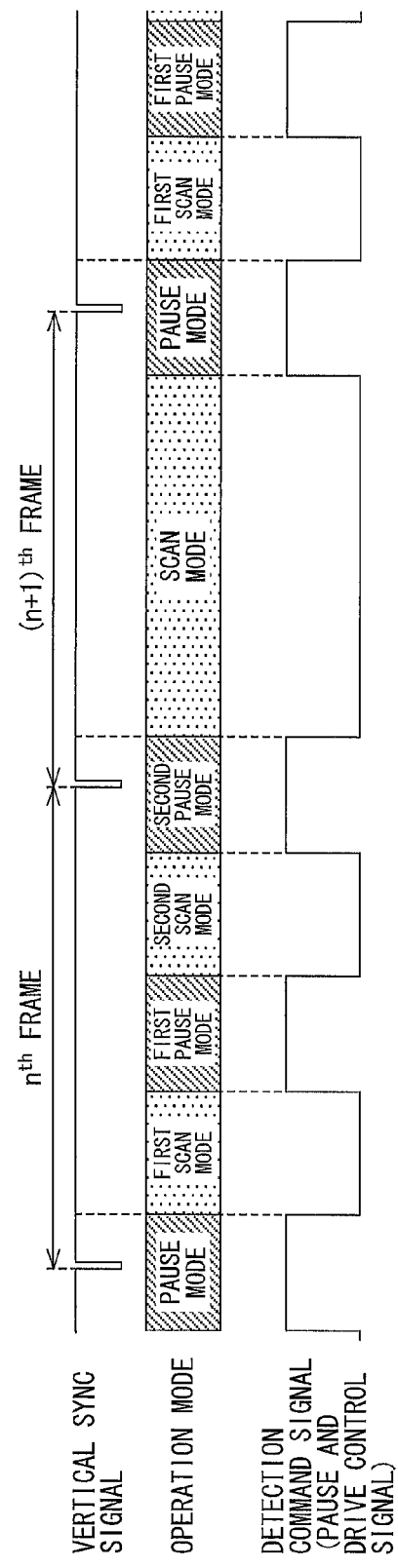
FIG. 8 is a timing chart showing temporal changes in operation status and signal status of the display device.

FIG. 8 is a timing chart showing temporal changes in operation status and signal status of the display device 2 according to the present embodiment. Specifically, FIG. 8 shows a vertical sync signal, an operation status, and a pause and drive control signal, starting from the top.

FIG. 8 shows an example where normal-mode scanning and multi-mode scanning are alternately carried out for every one-frame period. Note that the total length of time of a scan mode per one-frame period during normal-mode scanning may or may not be the same as the total length of time of scan modes per one-frame period during multi-mode scanning.

Although, in the present embodiment, the selecting section 72 makes a selection under a predetermined condition, the selecting section 72 may also make a selection in accordance with a command from the main device 10. In this case, it is possible to increase, at a timing determined by the main device 10, the number of times the touch panel 3 carries out an operation of detection.

Modification

A modification of an electronic apparatus 1 according to the present embodiment is described below with reference to FIGS. 10 and 11.

(Electronic Apparatus 1')

Figure 10:
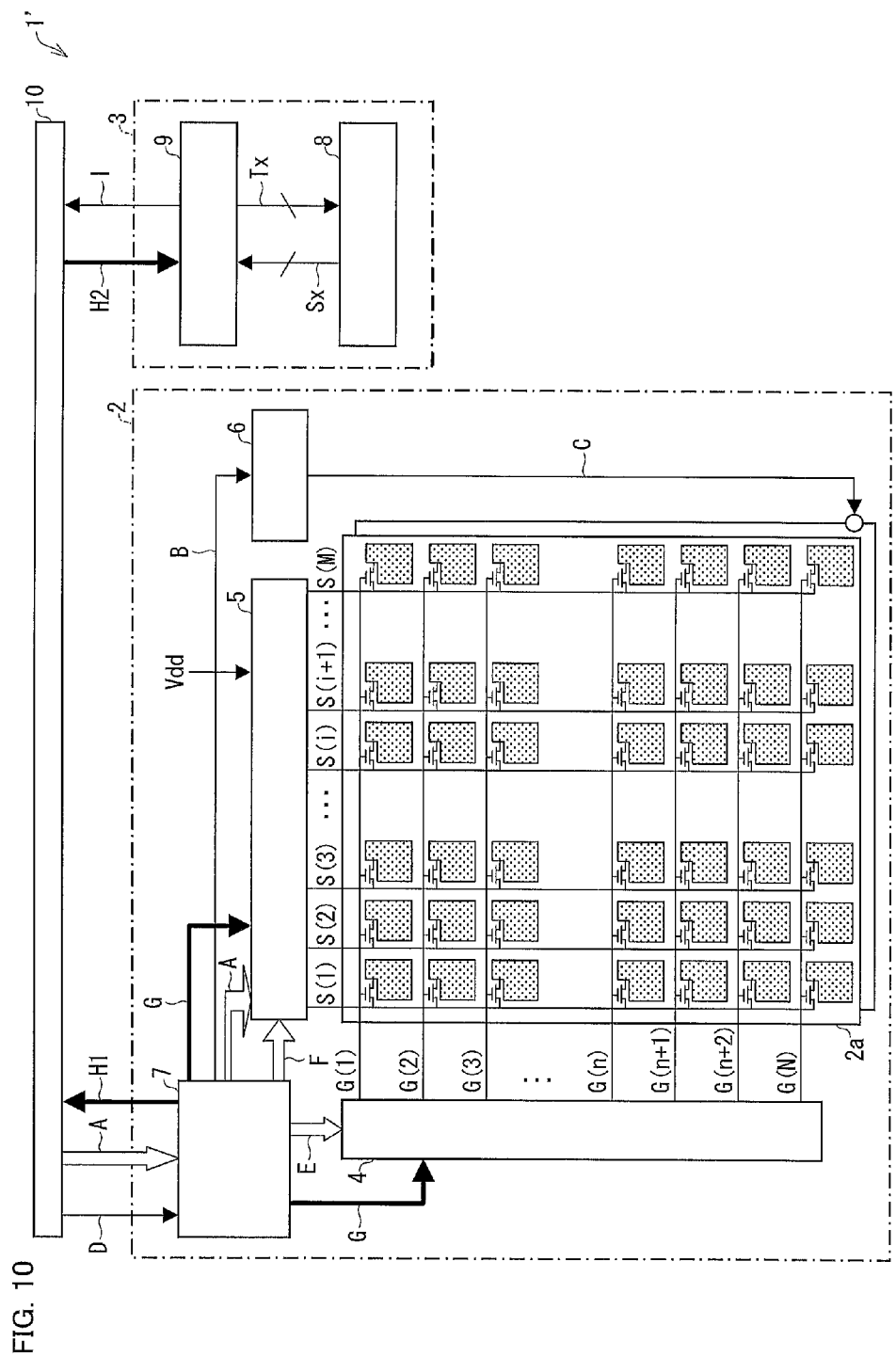
FIG. 10 is a block diagram showing, in detail, a configuration of a modification of the electronic apparatus.

FIG. 10 is a block diagram showing, in detail, a configuration of an electronic apparatus 1' according to the present embodiment. The electronic apparatus 1 and the electronic apparatus 1' differ from each other in terms of the path of a detection command signal.

In the electronic apparatus 1 shown in FIG. 9, as mentioned above, the timing controller 7 of the display device outputs a detection command signal directly to the controlling section 9 of the touch panel 3.

In the electronic apparatus 1' shown in FIG. 10, on the other hand, the timing controller 7 of the display device 2 outputs a detection command signal via the main device to the controlling section 9 of the touch panel 3.

Specifically, the timing controller 7 outputs a first detection command signal (indicated by an arrow H1) to the main device 10. Then, the main device 10, which has received the first detection command signal, outputs, to the controlling section 9, a second detection command signal (indicated by an arrow H2) whose timing is substantially the same as that of the first detection command signal.

In the case of a detection command signal outputted through the path in the electronic apparatus 1' shown in FIG. 10, there is a delay corresponding to a length of time required for the detection command signal to pass through the main device 10. Additionally, in a case where the first detection command signal is subjected to signal processing such as signal level inversion, the signal processing also causes a delay in the detection command signal.

These delays, i.e., the delay caused by passage of the signal through the main device 10 and the delay caused by the signal processing carried out by the main device 10, results in a delay time Tdelay between the first detection command signal and the second detection command signal.

Figure 11:
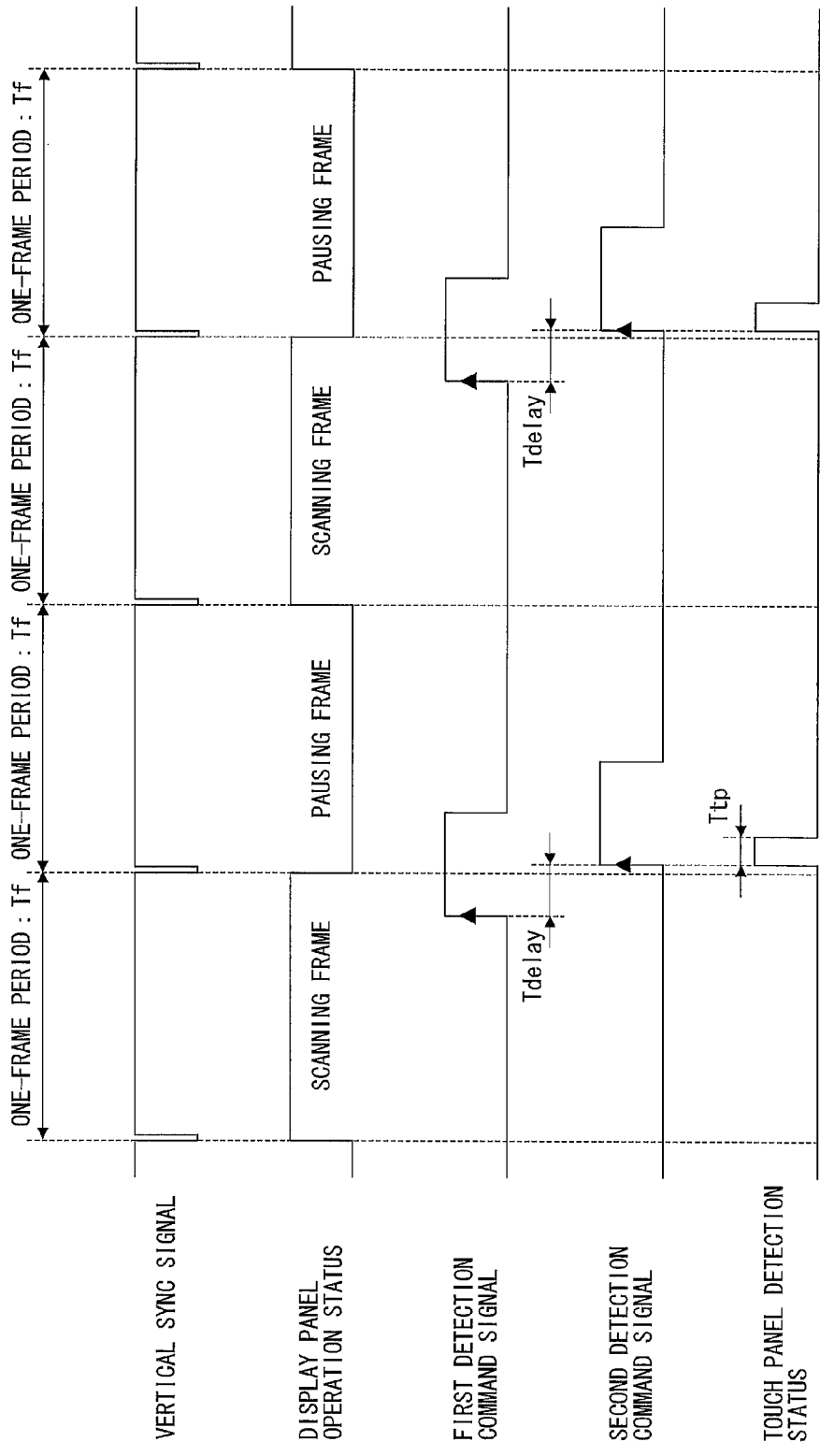
FIG. 11 is a timing chart showing a method for driving a display device in consideration of delay time.
Figure 12:
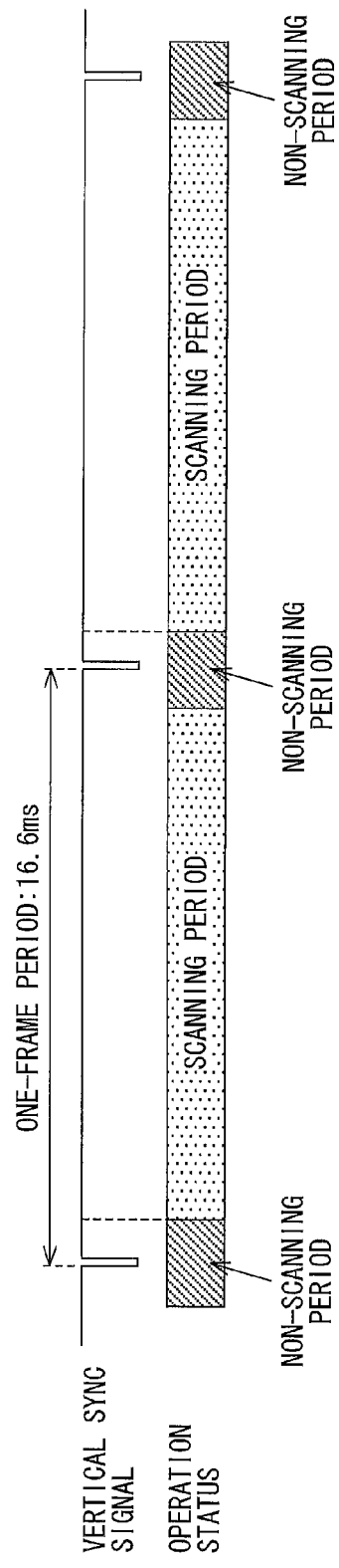
FIG. 12 is a timing chart showing a temporal change in operation status of a conventional display device.

Therefore, the electronic apparatus 1' shown in FIG. 10 may be configured to output a first detection command signal and a second detection command signal so as to compensate for the delay time Tdelay (for example, see FIG. 11). For example, the timing controller 7 may be configured to output, to the main device 10, a first detection command signal (indicated by the arrow H1) at a point in time that is earlier than a start time of a touch panel detection period Ttp by the delay time Tdelay.

Upon receiving the first detection command signal, the main device 10 (i) processes, as needed, the first detection command signal so as to generate a second detection command signal and then (ii) outputs the second detection command signal to the controlling section 9 of the touch panel 3.

This makes it possible to set the start time of the touch panel detection period Ttp at a point in time where the delay time Tdelay has elapsed since the point in time where the first detection command signal was outputted.

(Display Panel 2a)

The display panel 2a according to the present embodiment may be a liquid crystal panel including a liquid crystal layer. In this case, the display device 2 according to the present embodiment is a liquid crystal display device.

Further, each pixel of the display panel 2a may have an organic EL (electroluminescence) diode that is an element which emits light with luminance that varies depending on an electric current flowing through the element. In this case, the display device 2 according to the present embodiment is an organic EL display (organic electroluminescence display device).

An organic EL display consumes a large amount of electric current while in a scan mode. This causes a detection device to be more affected by a drive signal generated by the organic EL display. Therefore, the advantageous effects of the present invention are expected to be more significant by applying the present invention to the organic EL display.

Modification 2

Figure 18:
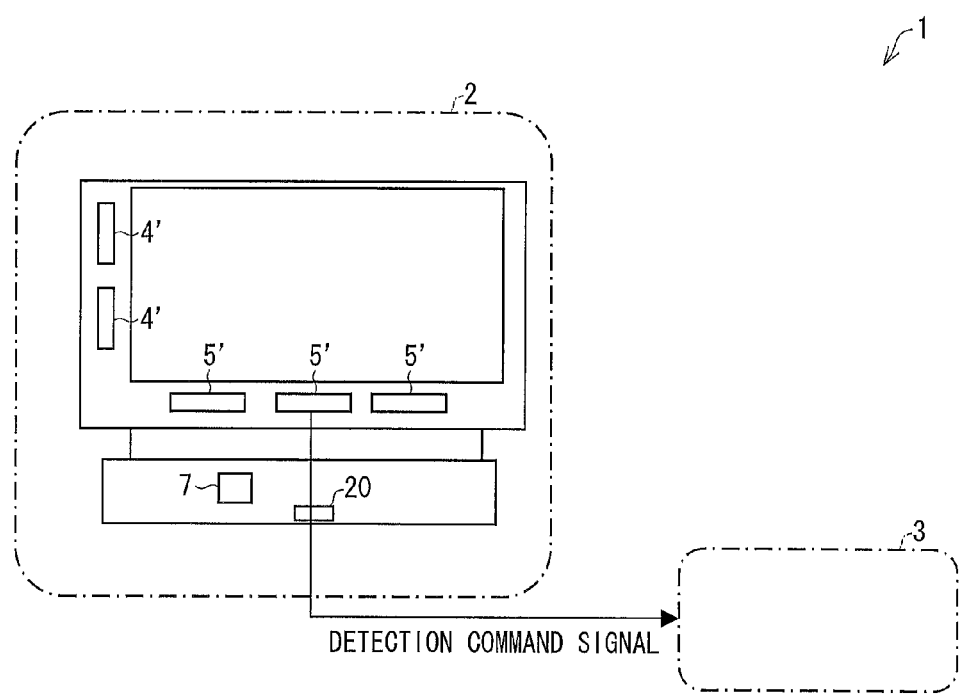
FIG. 18 is an explanatory diagram showing a configuration of a modification of the display device.

FIG. 18 is an explanatory diagram showing a configuration of a modification of the display device 2 shown in FIG. 9. In the display device 2 shown in FIG. 9, the timing controller 7 outputs, to the controlling section 9, a detection command signal (indicated by the arrow H) whose timing is the same as that of the pause and drive control signal.

It should be noted here that in the display device 2 shown in FIG. 9, there is a delay of several clocks to several lines of scanning between (i) a point in time where the timing controller 7 receives video image signals (clock signal, sync signal, video image signal etc.) and (ii) a point in time where the timing controller 7 outputs sync control signals (source start pulse signal, source latch strobe signal, source clock signal etc.) to the signal line drive circuit 5. This is because time is required for the timing controller 7 to generate timings and process images.

On the other hand, the display device 2 shown in FIG. 18 may be configured such that the scanning line drive circuit 4 includes gate driver sections 4' (two gate drive sections 4' in the example shown in FIG. 18), the number of which is determined according to the number of scan signal lines G.

Further, the display device 2 shown in FIG. 18 may be configured such that the signal line drive circuit 5 includes source driver section 5' (three source driver section 5' in the example shown in FIG. 18; also referred to as "signal line drive sections" or "detection commanding means"), the number of which is determined according to the number of data signal lines S.

Because of the absence of such a delay, these source driver sections 5' more precisely recognize timings of scan modes and pause modes than the timing controller 7 does.

Hence, it is possible to, as shown in FIG. 18, let one of the source driver sections 5' output detection command signal to the controlling section 9 to the controlling section 9 of the touch panel 3 via a connection terminal 20. This makes it possible to eliminate the influence of a delay in outputting detection command signal from the timing controller 7 to the controlling section 9. This makes it possible to more accurately communicate periods of pause modes of the display device 2 to the touch panel 3, thus making it possible to more accurately control an operation of detection by the detection section 8 of the touch panel 3.

Note here that in each of the embodiments describe above, a start time and a finish time of a touch panel detection period need only match a start time and a finish time, respectively, of a period during which a detection command signal is active.

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

For example, while a detection command signal is supplied from the timing controller 7 to the touch panel 3 in each of the embodiments described above, it is also possible for the scanning line drive circuit 4 to transmit a detection command signal to the touch panel 3, since a pause and drive control signal, which corresponds to the detection command signal, is outputted from the timing controller 7 to the scanning line drive circuit 4.

In addition, while the touch panel 3 is used in each of the embodiments described above the present invention is applicable to any detection device. Examples of the detection device encompass, other than the touch panel 3, an RF (radio frequency) receiving circuit that receives (detects) a radio wave from an external device. The RF receiving circuit, when receiving a radio wave, is also affected by EMI (electromagnetic interference) emitted from a display device. For this reason, accuracy of signal reception can be improved by the RF receiving circuit receiving (detecting) a radio wave while the display device is in a pause mode.

In order to attain the object, a display device of the present invention includes: a display element for displaying an image on a screen; and driving means for driving the display element so that a scan mode for carrying out scanning and a pause mode for pausing the scanning are alternately repeated, the driving means being capable of driving the display element so that scanning of a single frame is carried out by going through the scan mode a plurality of times and the pause mode a plurality of times, during the pause mode, the driving means outputting, to an external detection device, a detection command signal which commands that detection be carried out.

In order to attain the object, a method of the present invention is a method for driving a display device, said display device including: a display element for displaying an image on a screen, the display device driving the display element so that a scan mode for carrying out scanning and a pause mode for pausing the scanning are alternately repeated, said method including the steps of: driving the display element so that scanning of a single frame is carried out by going through the scan mode a plurality of times and the pause mode a plurality of times, and during the pause mode, outputting, to an external detection device, a detection command signal which commands that detection be carried out.

With the configuration and the method, it is possible to scan a single frame by going through a scan mode a plurality of times and a pause mode a plurality of times. This enables the display device of the present invention to go through a pause mode more times than does a conventional display device that is configured to scan a single frame by going through a screen once and a pause mode once.

Further, the external detection device carries out detection by receiving a detection command signal which was outputted from the display device during the pause mode. This makes it possible to improve accuracy of a result of the detection. Further, since it is thus possible to increase the number of times of the pause modes, it is also possible to increase the number of times the detection is carried out. This enables the detection device to achieve, for example, handwriting input.

The display device according to an embodiment of the present invention is preferably configured such that, during the pause mode, the driving means either (i) reduces or pauses an operation of a circuit in the display device, or (ii) lowers performance of the circuit. In this case, it is possible to remarkably reduce power consumption during the pause mode. Further, since the display device can reduce the generation of noises by the driving, accuracy of a result of detection by the detection device can be further improved.

Examples of the display device encompass a matrix display element including a plurality of pixel electrodes arranged in a matrix manner.

The display device in accordance with the embodiment of the present invention can also be configured such that the scanning is interlaced scanning. In this case, basic scanning of the entire screen is carried out. This causes less display quality deterioration compared with a case where parts of the screen are scanned with time lags in between. Note that it is possible to employ such interlaced scanning as skipping every other line when scanning lines. Alternatively, it is also possible to carry out such interlaced scanning as skipping every few lines when scanning lines.

Meanwhile, among the display devices described above, there is a display device configured so that the driving means drives the display element so that polarities of voltages that are applied to the plurality of pixel electrodes, respectively, are inverted while scanning of a single frame is being carried out. This causes a detection device to be more affected by a drive signal generated by the display device. Therefore, the advantageous effects of the present invention are expected to be more significant by applying the present invention to the display device.

The display device according to the embodiment of the present invention can be configured such that the driving means drives the display element so that polarities of voltages that are applied to the plurality of pixel electrodes, respectively, are inverted immediately before a transition from the pause mode to the scan mode. In this case, it is possible to cause less display quality deterioration, such as that caused by a luminance gradient, compared with a case where, immediately after a transition from a scan mode to a pause mode, the polarity of an image signal is inverted and then the image signal is inputted to the display element.

The display device in accordance with the embodiment of the present invention can be configured such that: the display device further includes a plurality of data signal lines and a plurality of scan signal lines for driving the plurality of pixel electrodes; the driving means includes a data drive circuit and a scan drive circuit for driving the plurality of data signal lines and the plurality of scan signal lines, respectively; and the detection command signal is outputted from either the data drive circuit or the scan drive circuit.

Since the data drive circuit and the scan drive circuit are provided closest to the display element among all circuits for driving the display element, the data drive circuit and the scan drive circuit more precisely comprehend timings for driving the display device. That is, the data drive circuit and the scan drive circuit can also comprehend periods of pause modes precisely. This allows, by causing either the data drive circuit or the scan drive circuit to output a detection command signal, a detection device to certainly carry out detection during a pause mode.

The display device in accordance with the embodiment of the present invention is preferably configured such that the driving means further includes: normal-mode scanning driving means for driving the display element so that scanning of a single frame is carried out by going through the scan mode once and the pause mode once; multi-mode scanning driving means for driving the display device so that scanning of a single frame is carried out by going through the scan mode a plurality of times and the pause mode a plurality of times; and selecting means for selecting either the normal-mode scanning driving means or the multi-mode scanning driving means.

Examples of the selecting means encompass selecting means that has set therefor a ratio between (i) a period of time during which the normal-mode scanning driving means is selected and (ii) a period of time during which the multi-mode scanning driving means is selected; and the selecting means selects either the normal-mode scanning driving means or the multi-mode scanning driving means in accordance with the ratio.

Examples of the selecting means also encompass selecting means that has set therefor either (i) the number of times the normal-mode scanning driving means is selected during a predetermined period of time or (ii) the number of times the multi-mode scanning driving means is selected during the predetermined period of time; and the selecting means selects either the normal-mode scanning driving means or the multi-mode scanning driving means in accordance with the number of times.

In these cases, the number of pause modes during a predetermined period of time, i.e., the number of times detection is to be carried out during the predetermined period of time, can be set to a desirable number.

Examples of the selecting means also encompass a selecting means that selects either the normal-mode scanning driving means or the multi-mode scanning driving means in accordance with a command from an external device. In this case, it is possible to increase, at a timing determined by the external device, the number of times detection to be carried out.

Examples of the display device encompass a liquid crystal display device and an organic electroluminescence (EL) display device. An organic EL display consumes a large amount of electric current while in a scan mode. This causes a detection device to be more affected by a drive signal generated by the organic EL display. Therefore, the advantageous effects of the present invention are expected to be more significant by applying the present invention to the organic EL display.

The display device in accordance with the embodiment of the present invention is preferably configured such that: the display element includes (i) a plurality of pixels and (ii) a plurality of switching elements provided on the plurality of pixels, respectively; and the plurality of switching elements are each a TFT whose semiconductor layer is made of an oxide semiconductor.

By employing, as a switching element to be provided on each pixel, a TFT in which an oxide semiconductor having relatively high electron mobility is used for a semiconductor layer, it is possible to increase the amount of electron mobility while image data is written onto each pixel, and it is therefore possible to reduce the amount of time it takes for the image data writing. This allows for significantly fast scanning, and therefore allows a period of scanning mode to be reduced. Therefore, it is possible to sufficiently secure a period of pause mode. Accordingly, accuracy of a result of detection by the detection device can be further improved. Note that it is preferable that IGZO which has high electron mobility, is used as the oxide semiconductor.

Effects identical to the advantageous effects described earlier can be produced if the use is made of an electronic apparatus including: the display device; and a detection device for carrying out detection in accordance with a detection command signal from the display device.

Examples of the detection device encompass (i) a touch panel provided on a screen of the display device and (ii) an RF receiving device for detecting a radio wave and then receiving a signal contained in the radio wave.

Since the touch panel is provided in the proximity of the display device, the touch panel is considerably affected by a drive signal of the display device. Therefore, the advantageous effects of the present invention are expected to be more significant in a case where a touch panel is used as the detection device.

Furthermore, the RF receiving device is susceptible to EMI (electromagnetic interference) emitted from a display device as a result of a drive signal of the display device. Therefore, the advantageous effects of the present invention are expected to be more significant in a case where an RF receiving device is used as the detection device.

INDUSTRIAL APPLICABILITY

As described above, a display device according to the present invention makes it possible to perform scanning of a single frame by going through a scan mode a plurality of times and a pause mode a plurality of times, and outputs a detection command signal to an external detection device during the pause modes. This makes it possible to (a) increase the number of times the external detection device carries out detection and (b) improve accuracy of a result of the detection. As such, the display device is applicable to any display device that carries out scanning.

REFERENCE SIGNS LIST 1, 1' Electronic apparatus
2 Display device
2a Display panel (display element)
3 Touch panel
4 Scanning line drive circuit (driving means)
5 Signal line drive circuit (driving means)
6 Common electrode drive circuit
7 Timing controller (driving means)
8 Detecting section
9 Controlling section 10 Main device
70 Normal-mode scanning timing circuit (normal-mode scanning driving means)
71 Multi-mode scanning timing circuit (multi-mode scanning driving means)
72 Selecting section (selecting means)

The invention claimed is:

1. An electronic apparatus including a display device and a touch panel,
the display device comprising:
a display element configured to display an image on a screen, and
driving circuits configured to drive the display element so that a scan mode carrying out scanning and a pause mode pausing the scanning are alternately repeated, wherein
each of the scan mode and the pause mode are alternately repeated in at least a single one of a plurality of frames to thereby occur a plurality of times in at least the single one of the plurality of frames,
during the pause mode, the driving circuits are configured to output, to the touch panel, a detection command signal which commands that detection of input to the touch panel be carried out,
the display element is a matrix display element including a plurality of pixel electrodes arranged in a matrix manner,
the display circuits further include a plurality of data signal lines and a plurality of scan signal lines configured to drive the plurality of pixel electrodes,
the driving circuits include a data drive circuit and a scan drive circuit configured to drive the plurality of data signal lines and the plurality of scan signal lines, respectively,
the detection command signal is outputted from either the data drive circuit or the scan drive circuit, and
the touch panel is configured to carry out a detection of the input to the touch panel in accordance with the detection command signal from the display device.

2. The electronic apparatus as set forth in claim 1, wherein during the pause mode, at least one of the driving circuits is operated such that power consumption of the electronic apparatus is reduced.

3. The electronic apparatus as set forth in claim 1, wherein the scanning is interlaced scanning.

4. The electronic apparatus as set forth in claim 1, wherein the driving circuits further include:
a normal-mode scanning driving circuit configured to drive the display element so that scanning of a single frame is carried out by going through the scan mode once and the pause mode once;
a multi-mode scanning driving circuit configured to drive the display device so that scanning of a single frame is carried out by going through the scan mode a plurality of times and the pause mode a plurality of times; and
a selecting section configured to select either the normal-mode scanning driving circuit or the multi-mode scanning driving circuit.

5. The electronic apparatus as set forth in claim 4, wherein:
the selecting section has set therefor a ratio between (i) a period of time during which the normal-mode scanning driving circuit is selected and (ii) a period of time during which the multi-mode scanning driving circuit is selected; and
the selecting section is configured to select either the normal-mode scanning driving circuit or the multi-mode scanning driving circuit in accordance with the ratio.

6. The electronic apparatus as set forth in claim 4, wherein:
the selecting section has set therefor either (i) the number of times the normal-mode scanning driving circuit is selected during a predetermined period of time or (ii) the number of times the multi-mode scanning driving circuit is selected during the predetermined period of time; and
the selecting section is configured to select either the normal-mode scanning driving circuit or the multi-mode scanning driving circuit in accordance with the number of times.

7. The electronic apparatus as set forth in claim 4, wherein the selecting section is configured to select either the normal-mode scanning driving circuit or the multi-mode scanning driving circuit in accordance with a command from an external device.

8. The electronic apparatus as set forth in claim 1, wherein the display device is a liquid crystal display device.

9. The electronic apparatus as set forth in claim 8, wherein the driving circuits are configured to drive the display element so that polarities of voltages that are applied to the plurality of pixel electrodes, respectively, are inverted while scanning of a single frame is being carried out.

10. The electronic apparatus as set forth in claim 8, wherein the driving circuits are configured to drive the display element so that polarities of voltages that are applied to the plurality of pixel electrodes, respectively, are inverted immediately before a transition from the pause mode to the scan mode.

11. The electronic apparatus as set forth in claim 1, wherein the display device is an organic electroluminescence display device.

12. The electronic apparatus as set forth in claim 1, wherein:
the display element includes (i) a plurality of pixels and (ii) a plurality of switching elements provided on the plurality of pixels, respectively; and
the plurality of switching elements are each a TFT whose semiconductor layer is made of an oxide semiconductor.

13. The electronic apparatus as set forth in claim 12, wherein the oxide semiconductor is IGZO.

14. A method for controlling timing of an electronic apparatus including (i) a display device including a display element configured to display an image on a screen and (ii) a touch panel,
the display device driving the display element so that a scan mode carrying out scanning and a pause mode pausing the scanning are alternately repeated in at least a single one of a plurality of frames, both the scan mode and the pause mode respectively occur a plurality of times in at least the single one of the plurality of frames,
the display element including a plurality of pixel electrodes arranged in a matrix manner,
the display element further including a plurality of data signal lines and a plurality of scan signal lines configured to drive the plurality of pixel electrodes,
the display device including a data drive circuit and a scan drive circuit configured to drive the plurality of data signal lines and the plurality of scan signal lines, respectively,
said method comprising the steps of:
during the pause mode, causing either the data drive circuit or the scan drive circuit to output, to the touch panel, a detection command signal which commands that detection of input to the touch panel be carried out, and
causing the touch panel to carry out detection of the input to the touch panel in accordance with the detection command signal from the display device.

15. The electronic apparatus as set forth in claim 2, wherein during the pause mode, the at least one of the driving circuits stops receiving a horizontal sync signal and a video image signal.

16. The electronic apparatus as set forth in claim 2, wherein during the pause mode, the at least one of the driving circuits stops an analog amplifier.

17. The electronic apparatus as set forth in claim 2, wherein during the pause mode, the at least one of the driving circuits reduces an operation speed by half.

* * * * *